United States Patent [19]
Greneker, III et al.

[11] Patent Number: 5,917,430
[45] Date of Patent: Jun. 29, 1999

[54] RADAR BASED HIGHWAY SAFETY WARNING SYSTEM

[75] Inventors: Eugene F. Greneker, III; Walter Bruce Warren, both of Marietta, Ga.

[73] Assignee: The Safety Warning System, L.C., Englewood, Fla.

[21] Appl. No.: 08/520,107

[22] Filed: Aug. 28, 1995

[51] Int. Cl.$^6$ .................................................... G08G 1/09
[52] U.S. Cl. ........................... 340/905; 340/936; 455/66; 342/60
[58] Field of Search ............... 455/84, 66, 54.1, 455/70, 71, 258, 517; 340/905, 936, 901, 961; 342/30, 45, 60, 42, 44, 461, 465

[56] References Cited

U.S. PATENT DOCUMENTS

| | | |
|---|---|---|
| 3,550,124 | 12/1970 | Heft et al. . |
| 3,673,560 | 6/1972 | Barsh et al. ............................... 340/33 |
| 3,772,641 | 11/1973 | Grosser et al. ........................... 340/33 |
| 3,784,970 | 1/1974 | Simpkin .................................... 340/33 |
| 3,902,684 | 9/1975 | Queeney . |
| 4,216,545 | 8/1980 | Flickshu et al. .......................... 455/77 |
| 4,291,309 | 9/1981 | Spiccer et al. ............................ 342/60 |
| 4,443,790 | 4/1984 | Bishop ..................................... 340/539 |
| 4,484,356 | 11/1984 | Geesen et al. ........................ 455/165.1 |
| 4,535,297 | 8/1985 | Puckette .................................. 375/328 |
| 4,616,187 | 10/1986 | Watanabe ................................ 375/334 |
| 4,652,838 | 3/1987 | Nossen ..................................... 342/60 |
| 4,733,238 | 3/1988 | Fiden ....................................... 342/60 |
| 4,794,394 | 12/1988 | Halstead ................................... 340/902 |
| 4,888,595 | 12/1989 | Friedman ................................. 342/457 |
| 5,091,906 | 2/1992 | Reed et al. ............................. 370/94.1 |
| 5,093,663 | 3/1992 | Baechtiger et al. ....................... 242/60 |
| 5,115,515 | 5/1992 | Yamamoto et al. ....................... 455/71 |
| 5,208,835 | 5/1993 | Weeks et al. .............................. 455/71 |
| 5,214,793 | 5/1993 | Conway et al. ........................ 455/49.1 |
| 5,235,329 | 8/1993 | Jackson .................................. 340/902 |
| 5,289,183 | 2/1994 | Hasset et al. ........................... 340/905 |
| 5,295,180 | 3/1994 | Vendetti et al. ....................... 455/33.1 |
| 5,307,060 | 4/1994 | Prevulsky ................................ 340/902 |
| 5,497,148 | 3/1996 | Oliva ....................................... 340/905 |

Primary Examiner—Edward F. Urban
Attorney, Agent, or Firm—Foley & Lardner

[57] ABSTRACT

A system for transmitting messages, such as safety hazard warning messages, to vehicles causes alerts to be generated in conventional radar detectors and more detailed messages to be provided to drivers with message capable radar receivers. The transmitted radar signal is modulated in frequency or phase or swept in frequency in different directions or at different rates to define the logical state of each bit of the message. A continuous wave (CW) maker signal may also be transmitted to assure detection by a conventional police radar detector and to allow a receiver capable of decoding messages to make adjustments that center an intermediate frequency (IF) generated from the received signal in the receiver IF passband. A message capable receiver decodes the modulated signal to communicate to the vehicle operator the contents of the transmitted message or a stored message corresponding to a transmitted code. The signal modulation is such that conventional radar detectors do not reject the signal but cause an alert to be generated, indicating to the driver the need to reduce vehicle speed to accommodate upcoming road conditions or obstacles.

41 Claims, 11 Drawing Sheets

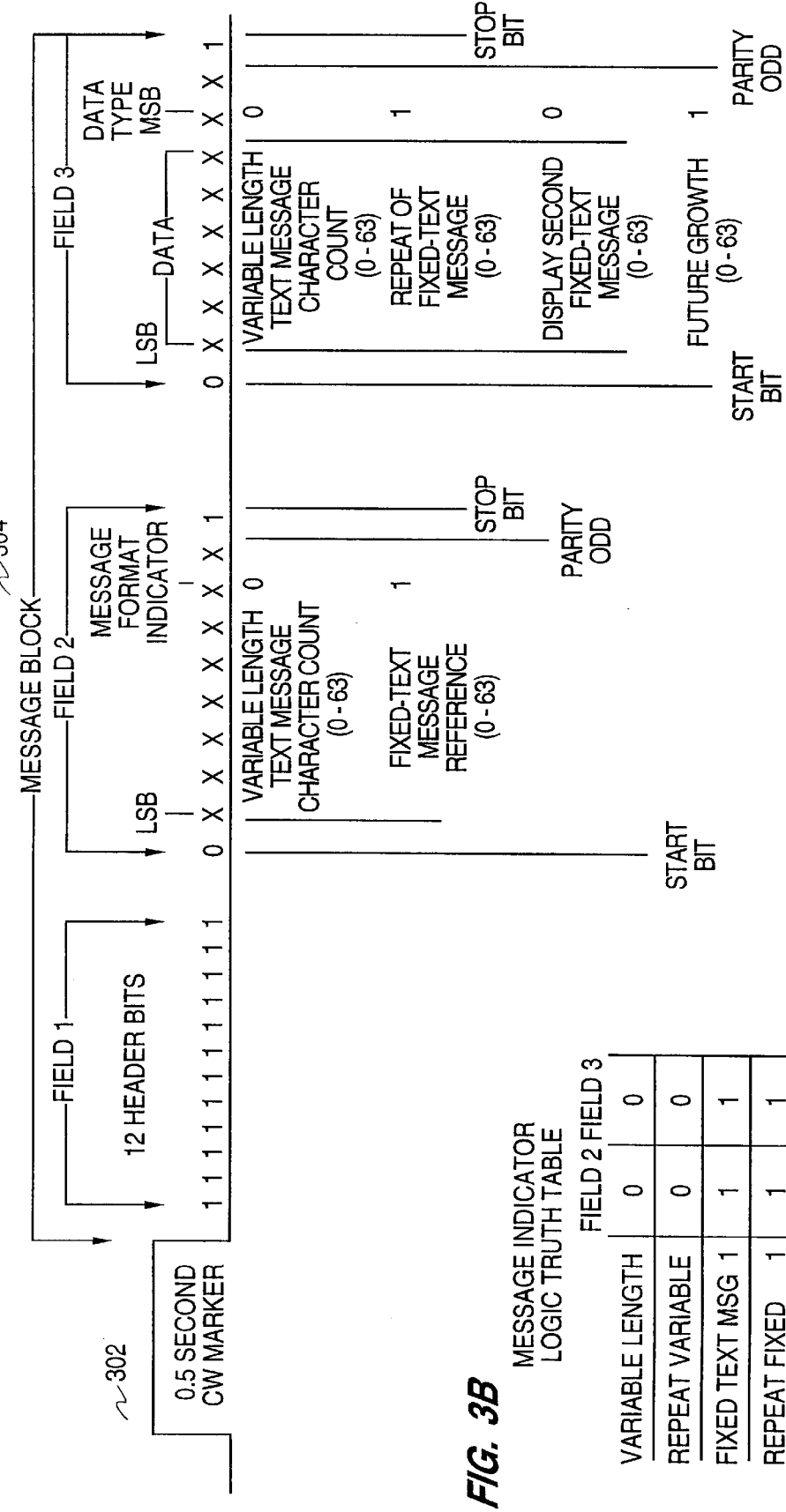

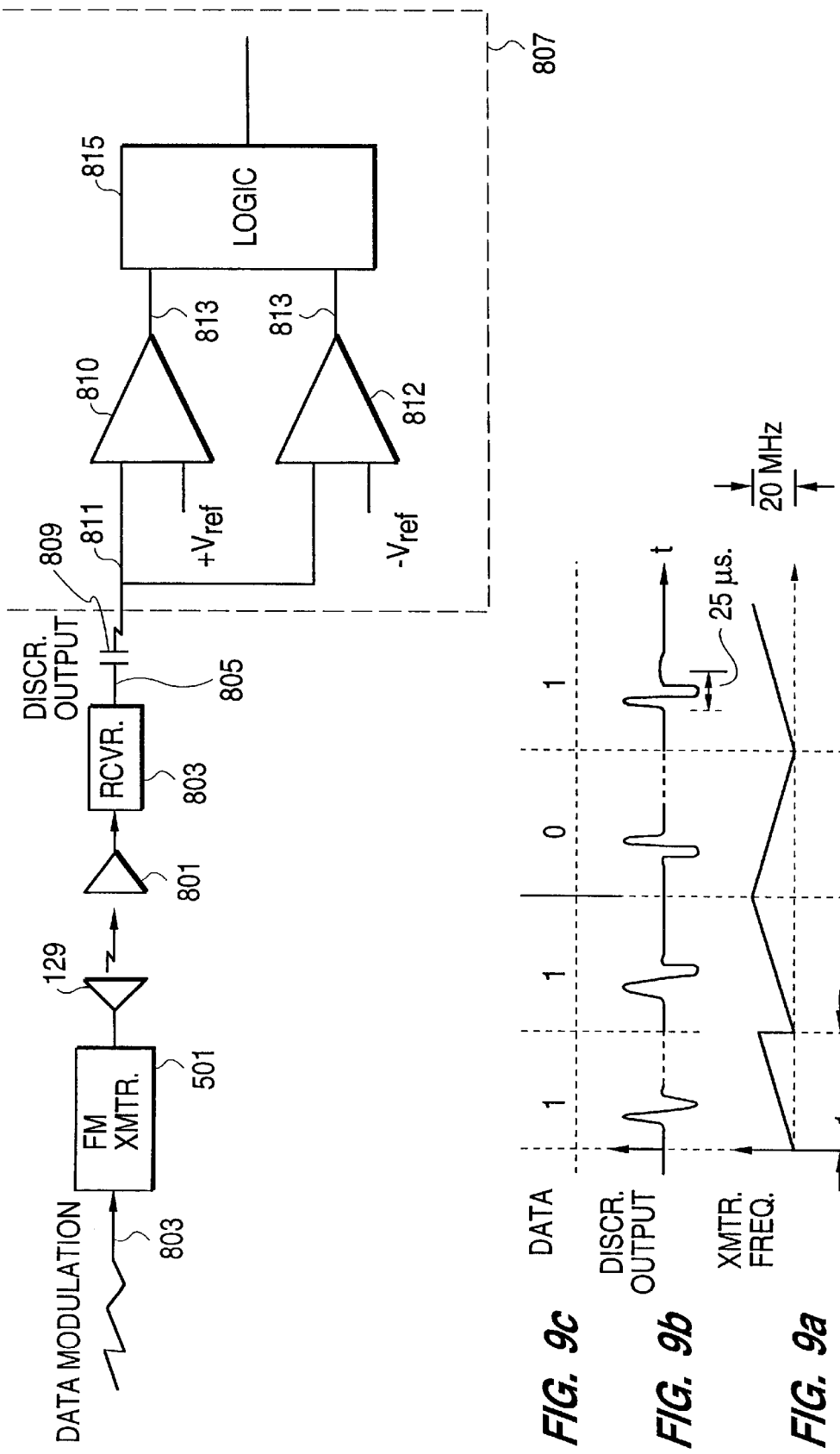

RADAR BASED HIGHWAY SAFETY WARNING SYSTEM

FIELD OF THE INVENTION

The invention relates to highway safety devices and, in particular, to a method and apparatus for alerting drivers to adjust their driving to accommodate hazards or other conditions they are about to encounter. The invention provides a police band radar signal that can be detected by a customized receiver or by a conventional radar detector. These devices can be used to generate an audio or visual alert signal or to provide an audio or visual message.

BACKGROUND OF THE INVENTION

Systems to alert drivers to adjust speed to the posted limit or to levels lower than the posted limit, for example, to accommodate upcoming road hazards or construction, have generally been limited to the use of signs. Such signs must be physically placed in advance of the hazard or construction site by law enforcement personnel or highway road crews. If not properly placed or lighted, such signs can be missed by drivers, further adding to the hazard.

Since law enforcement or road personnel cannot continuously monitor all segments of a road, signs cannot be used to warn drivers of transient conditions such as smoke, fog, wind, intense precipitation and other weather conditions. Further, since signs must be physically placed into position by appropriate personnel, even when road personnel are aware of a hazardous condition, typically there is insufficient time for placement of such signs to alert drivers to take precautions.

Some highways employ radio broadcasts to alert drivers to upcoming hazards. These radio broadcast systems face problems similar to those encountered in sign based systems. The time required to prepare a broadcast and the inability to monitor all road segments simultaneously makes radio broadcasts warning systems of limited value. Further, these systems require the driver to tune the radio receiver to a designated AM or FM band frequency, not already assigned to another broadcaster. Many drivers do not use the radio or tune to the designated frequency channel. Those drivers who do tune to the designated frequency channel are distracted from observing traffic conditions, thereby increasing the risk of accidents.

In addition, in the conventional systems described above, it is not practical to use signs or radio broadcast messages to alert drivers of an approaching emergency vehicle. Thus, a more reliable system to alert drivers of such hazards and conditions without distracting the driver is desirable to improve safety.

Radars transmitting in the X, K, or Ka bands have been used by law enforcement agencies to enforce speed limits for some time. Many drivers employ radar detectors which alert the driver when the vehicle is being radiated by such a police radar. In response to the alert, the driver can verify his compliance with the speed limit or adjust vehicle speed to be within the posted limit. Thus, an infrastructure of transmitters and receivers already exists for sending signals to drivers. Some radar detectors, however, have the ability to distinguish police radars from other radar signals generated. Thus, in order to use the existing infrastructure, it is necessary to provide a signal which such "smart" radar detectors would not reject.

SUMMARY AND OBJECTS OF THE INVENTION

In view of the above, it is an object of the invention to provide a safety warning system for alerting drivers to the presence of hazards and other circumstances which warrant traveling at reduced speed.

It is another object of the invention for such a safety warning system to operate passively, and without requiring the driver to take some action to receive the message.

It is another object of the invention to provide such a safety warning system in a manner compatible with the existing police radar and radar detector infrastructure.

It is a still further object of the invention to provide a transmitter which can send a message that will cause an alert to be generated by a conventional radar detector and will also cause a modified radar detector to provide a more detailed message to a driver of a vehicle receiving a transmission.

It is a still further object of the invention to provide a safety warning transmitter to send a message which will provide an audio or video message to a next generation radar detector while appearing as a police radar to generate an alert signal in current generation radar detectors.

The above and other objects of the invention are accomplished by a safety warning system which encodes a microwave signal at a rate sufficiently fast to allow a warning message to be repeated often, but at a rate low enough so that the modulation side bands do not spread excessively far from the carrier and as a result be rejected by signal rejection logic in the current generation of radar detectors. A system according to the invention is implemented with a transmitter which transmits the message to a vehicle. The transmitter includes a signal generator and a controller. The signal generator is responsive to data from the controller to produce two states used to communicate the safety warning message. The first state that is controlled is the transmission of a CW marker carrier. The CW marker carrier is transmitted at various times so that the radar detector logic can identify the safety warning signal and center the marker signal in the center of the bandpass of the detector's last intermediate frequency (IF). The second state is the transmission of a bit stream indicative of the safety warning message. A logic level '1' is transmitted by the signal carrier shifting from a frequency 2.5 MHz below the frequency of the CW marker frequency to a frequency 2.5 MHz above the CW marker frequency. A logic level '0' is transmitted by the signal carrier shifting from a frequency 2.5 MHz above the frequency of the CW marker to a frequency 2.5 MHz below the frequency of the CW marker frequency. The CW marker is not transmitted during the transmission of the digital bit stream. The typical transmission rate used for transmission is one bit every 0.5 milliseconds or a data rate of 2 Khz. The frequency of the CW marker is typically specified as 24.100 Ghz. to assure detection by existing radar detectors.

According to the invention, the message from the transmitter is decoded for display in a radar detector designed for that purpose or triggers an alarm in a conventional radar detector.

An alternative safety warning system according to the invention may employ a bi-phase modulator. In this embodiment the signal generator is responsive to data from the controller to produce a signal having a first phase and a signal having a second phase. Transitions between the first and second phases represent a first logical state and an absence of transitions between the first and second phases represents a second logical state of a bit of a message. A CW marker signal can also be employed. Alternatively, the transmitter can employ a swept frequency signal generator which produces signals swept over a predetermined frequency band, in this case, the police radar band. The signal generator is responsive to the controller to sweep the frequency band at a first rate which represents a first logical state and at a second rate which represents a second logical state of a bit of a message.

Another alternative according to the invention is to provide a transmitter with a swept frequency signal generator that produces a signal sweep over a predetermined band, in this case, the police radar band, in different directions to indicate different logical states. For example, the frequency is swept in a first direction from a higher frequency to a lower frequency to indicate a first logical state and in a second direction from a lower frequency to a higher frequency to indicate a second logical state of a bit of a message.

Using any of the above alternatives according to the invention, a conventional police radar detector will simply detect the presence of the safety warning transmitter's signal and generate an alert detectable by a driver of the vehicle being radiated. Without further information, the driver would be advised of the presence of the radar and could respond by lowering his speed. Since the transmitter according to the invention also provides signals with modulation that can be used to set logical bits of a message, a new generation of radar detectors customized to receive such messages will provide drivers with a more detailed description of upcoming driving conditions.

According to the invention, the message can be input by a user to the transmitter through an interface device, such as a keyboard, providing data to an external input terminal. Alternatively, the transmitter can be outfitted with sensors to detect particular hazard conditions, such as smoke or dangerous weather conditions and transmit an appropriate preprogrammed message. Other preprogrammed messages, such as messages indicating road obstructions or construction, can be preprogrammed and selected by the user. According to the invention, messages can be transmitted directly as digital representations of alphanumerics or graphical characters, or as a code. Receipt of a code by the vehicle's radar detector causes the detector to retrieve the corresponding message from its memory and display, the message contents or announce the message to the driver through a voice synthesizer.

A transmitter according to the invention can also be equipped with a receiver implementing a speed radar function which activates the controller to transmit a message to a vehicle exceeding a predetermined speed. In this way, only those vehicles traveling faster than a safe traveling speed for the prevailing conditions would receive the message. Such a function would be implemented with system elements to perform Doppler frequency detection, amplification, and frequency measurement, and would include a comparator to compare vehicle speed with an operator selected threshold speed, which if exceeded triggers the radar safety warning transmitter function. For example, the receiver could employ doppler shift detection and a discriminator to generate a voltage representative of an approaching vehicle's speed. The voltage would then be compared against a reference indicating the speed limit or some other safe speed for the prevailing conditions to generate a transmit enable signal from the controller.

In a similar manner a safety warning system according to the invention could be equipped with a receiver acting as a vehicle presence detector to detect the presence of a vehicle or a density of traffic flow and in response activate the transmitter. By maintaining the transmitter in an off state until traffic is detected, energy can be saved and, in the case of a battery powered system, useful battery life can be extended.

In a system according to the invention, transmitters would be placed at selected locations along the highway. In addition, emergency vehicles could be equipped with such transmitters to alert drivers in the vicinity of the emergency vehicle to slow down or clear a path. A further use of the system according to the invention would include equipping non-emergency vehicles with transmitters activated when the vehicle's hazard lights or other emergency systems are operated. This approach would alert drivers that there is a stopped vehicle in the vicinity. A system according to the invention could also be uses to transmit other safety and commercial messages to users of next generation radar detectors.

BRIEF DESCRIPTION OF THE DRAWINGS

The invention is described herein with reference to the accompanying drawings in which:

FIG. 3A shows a message block;

FIG. 3B is a truth table summarizing message type indicator logic;

FIG. 8 illustrates a system in which the direction of a sweep frequency generator is used to indicate logical states of bits of a message; and FIGS. 9A, 9B and 9C illustrate waveforms used in the system in FIG. 8.

DESCRIPTION OF THE PREFERRED EMBODIMENTS

A safety warning transmitter according to the invention can be mounted near a road or highway in advance of a vehicle hazard, such as a work zone. Mounting locations can include signs, light poles, railroad bridges, abutments permanent or temporary fences and the like and other fixed locations. A safety warning transmitter according to the invention can also be mounted on emergency vehicles such as fire engines, police cars and ambulances where they can be used to alert drivers of the emergency vehicles' imminent approach. Further, such a safety warning transmitter can be activated by the hazard warning light switch when mounted in any vehicle, including non-emergency vehicles, to alert approaching drivers of a stopped vehicle. The safety warning transmitter according to the invention can also be activated by any selected system in any vehicle, alone or in conjunction with other criteria. For example, such a transmitter could be activated when a vehicle applies its brakes, or could be programmed to activate when a vehicle applies its brakes in a low visibility area, such as a fog blanketed section of highway, as determined by a sensor.

The safety warning transmitter according to the invention transmits a signal that can be detected by the current generation of police radar detectors, thereby causing such detectors to alarm and alert the driver to reduce speed. The safety warning transmitter according to the invention also transmits a message which can be interpreted by a customized or next generation radar detector to provide an audio message or visual display indicating to the driver the type of hazard being approached by the vehicle or providing other relevant information.

Since many present conventional radar detectors are "smart," they reject signals that do not closely emulate the frequency and amplitude stable signals of a police radar. Thus, it is necessary that a transmitter according to the invention encode the signal in a manner that the current generation of smart police radar detectors does not reject the signal, while retaining the ability to send more specific messages to the next generation or customized receivers. According to the invention a signal transmitted by the safety warning transmitter is encoded at a sufficiently high rate that the warning message can be repeated often, but at a low enough rate that sidebands do not cause the signal rejection logic of the detector to ignore the warning.

Figure 1:
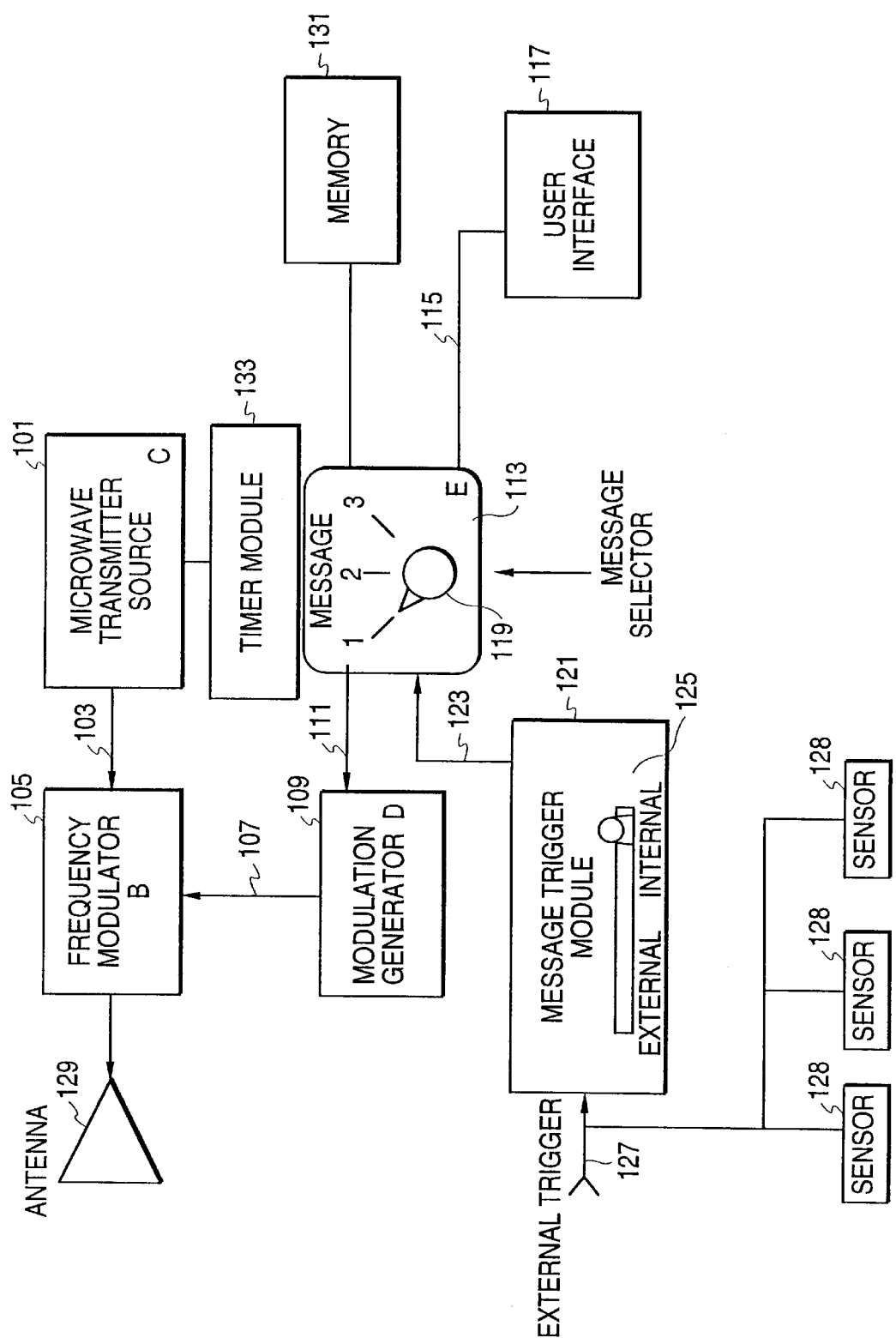
FIG. 1 is a block diagram showing a transmitter according to the invention.

FIG. 1 is a block diagram of a safety warning transmitter according to the invention, which can be used to send a message to the next generation radar detector while appearing as a police radar to the current generation of radar detectors. The transmitter in FIG. 1 encodes a microwave signal with a frequency shift modulation which generates sidebands insufficient to trigger signal rejection logic in some conventional radar detectors. A continuous wave (CW) marker is used to insure that the signal is not rejected by the signal rejection logic implemented in the current generation of radar detectors.

Microwave transmitter source 101 generates a signal in the police radar X, K or Ka band. The signal is transmitted over line 103 to frequency modulator 105 which acts as a controller controlling modulation of the transmitted signal. The frequency modulator 105 receives modulation data from modulation generator 109. Modulation generator 109 generates modulation signals to be sent over signal line 107 in response to message data on signal line 111 from message selector 113. Message selector 113 can select any of a plurality of stored messages, such as messages 1, 2 or 3. Such messages will typically be warnings to drivers of upcoming road hazards, but other messages may also be transmitted. The ordinarily skilled artisan will recognize that any number of such messages can be preprogrammed and stored. In addition, a message can be selected from an external terminal E which accesses a message over signal line 115 from a user interface 117, such as a keyboard or a wireless link to a message center (not shown). Message selector unit 113 is shown with a manual selector such as dial 119. However, it will be known to those of ordinary skill that any suitable hardware or software selector can be employed to perform this function.

The transmitter according to the invention also includes a message trigger module 121. Message trigger module 121 sends a signal over line 123 to message selector switch 119 causing message selector 113 to call a message from memory and, if necessary, override a timer module 133, discussed further herein, to generate a message. Message trigger module 121 can have an internal or external trigger which is set using switch 125. When switch 125 is set in the internal trigger mode, message trigger module 121 generates a trigger signal on line 123 at predetermined intervals. When switch 125 is set in the external position, message trigger module 121 generates a trigger signal on 123 in response to an external trigger input on signal line 127. Such an external trigger could be generated by one or more sensors 128 used to detect particular road conditions. For example, an anemometer used to measure wind speed could generate a signal on line 127 when the wind speed exceeds a predetermined value indicating a dangerous wind condition. As another example, a smoke or fog detector could be used to externally trigger message generation in response to heavy fog or smoke reducing driver visibility.

According to the invention, a frequency modulated signal indicative of the message being sent from message selector 113 is generated using modulation generator 109 and frequency modulator 105. Frequency modulator 105 controls the frequency of the transmitted signal in response to information it receives on line 107 from modulation generator 109. The safety warning transmitter according to the invention may also transmit a continuous wave (Cw) marker signal, as discussed further herein. The microwave signal received from the transmitter 101 is broadcast through antenna 129. It will be known to those of ordinary skill that a directional antenna may be used to provide gain in the direction of the oncoming traffic or a non-directional antenna may be used to provide an omni-directional signal. For example, an omnidirection radiation pattern might be used when the safety warning transmitter is mounted on an emergency vehicle installation. The polarization of the transmitted wave may also be varied to ensure optimum reception by a radar detector. It will also be known to those of ordinary skill that numerous types of sources can be used as the transmitter. For example, a varactor tuned Gunn microwave transmitter using a varactor tuning element to shift the frequency might be employed as transmitter 101. Any other type of transmitter capable of 5 Mhz of frequency control also may be used.

In order to assure detection of the logical states of each bit of the message, modulation generator 109 modulates the frequency at a rate of 1 bit every 0.5 millisecond. However, before any data is transmitted, a CW marker carrier is transmitted by the safety warning transmitter so that the receiver can center the CW marker carrier in the bandpass of the last IF stage. During message transmission, the carrier is swept around the center of the IF. In particular, the carrier is swept from 2.5 Mhz below the center of the IF to a frequency 2.5 Mhz above the center of the IF frequency if a data bit with the value of '1' is being transmitted. If a data bit of value '0' is being transmitted, the frequency is swept from 2.5 Mhz above the IF center frequency to 2.5 MHz below the center of the IF frequency. A linear ramp circuit can be used to generate a linear frequency sweep in the appropriate direction, depending on the logical state of the bit being transmitted.

The transmission of the CW marker serves two purposes. First, it provides a signal that allows the radar detector to find the center frequency that the data transmission will occur around. Second, it provides a carrier that can be detected by the current generation police radar detectors. The carrier will cause current generation detectors to alarm and thereby alert the driver that a hazard is being approached.

According to the invention, a message from message selector 113 can be routed as a digital code of logic states, such as logical 1's and logical 0's over line 111 to modulation generator 109. Modulation generator 109 then sends instructions to the frequency modulator 105 to produce a CW marker carrier and a low to high frequency change representing a bit with the value '1' and a high to low frequency swing representing a bit with the value A unique modulation pattern for the messages generated corresponding to the logical ones and zeros is provided by message selector 113. Messages can be transmitted as message text or as codes for messages to be retrieved from a memory in a receiver.

Predefined messages, referred to herein as fixed-text messages can be stored in memory 131 and accessed by the hazard message selector 113 to indicate a specific hazard. For example, sixty-four fixed text messages can be stored in memory and accessed by transmitting the corresponding code number. It is also possible to recall a first fixed-text message to be read by the driver and a second message to be appended to the first message thereby forming a composite message. For example, the following twelve messages might be stored in memory 131 as a subset of the fixed text messages. Message '01' might be transmitted as a single fixed text message and message '112' could be appended to message '01', thereby indicating the presence of a workzone with an obstruction in the road. The following list of messages is given by way of illustration and not limitation;

| Message Code | Message |
| --- | --- |
| 01 | Work zone |
| 02 | Fog zone |
| 03 | Damaged bridge |
| 04 | Train approaching a crossing |
| 05 | Emergency vehicle |
| 06 | Tornado |
| 07 | Road washout |
| 08 | Accident site |
| 09 | Heavy winds across highway |
| 10 | Heavy smoke zone |
| 11 | Tune radio to channel XXX for message |
| 12 | Obstruction in road |

Either the texts of the messages themselves or the codes for the messages can be stored in memory 131. In one version of the system, the message selected is retrieved from the memory and transmitted as alphanumeric characters. In another version of the system according to the invention, only codes for messages are stored in memory 131 and transmitted by the transmitter. Upon receipt, a specialized receiver decodes the code and, using the decoded information, accesses its memory to generate the corresponding alert or message to the driver of the vehicle. Such a receiver is discussed further herein with reference to FIG. 2. A conventional police radar detector without circuitry to decode the message would simply activate its alarm to alert the driver to reduce vehicle speed.

Message selector switch 119 can be used to select the desired message. The message selector switch 119 can be a manual dial as shown or it can be any other known type of switch, such as a push button switch, a thumb wheel switch, or a software controlled switch which retrieves the appropriate code from memory 131 in response to a command, for example, a command received from an internal processor or external device. For example, a processor can detect a message trigger from a sensor 128, and activate message selector 113 to retrieve the appropriate warning message from memory 131.

Message selector 113 can also be used to select a message applied to an external input E from a user interface 117 over line 115. Examples of such devices include a keyboard or a radio receiver which can receive wireless transmissions from a remote location. In a programmable mode, such a system can also be used to add additional messages for storage in memory 113.

Message generation can be triggered using message trigger module 121. Using switch 125, the message can be set for internal triggering, such that the message is transmitted repetitively at regular intervals regardless of external conditions. Set in the external position, switch 125 is used to trigger transmission of the message selected on a command from the external trigger received on line 127. Line 127 can be connected to one or more sensors which, upon detecting specific conditions, transmits an external trigger on line 127. The external trigger signal can be provided to line 127 on a wired or wireless link from a remote sensor, such as a weather sensing device.

The trigger signal provided to the message selector 113 on signal line 123 can be used to initiate a transmission of a synchronization signal or message header indicating to a receiver that a message is about to be received. Alternatively, receivers can simply wait to receive a sufficient number of bits to recognize the repeating pattern of bits before initiating an alert to a vehicle driver, thus avoiding the need for synchronization circuitry between a receiver and transmitter.

Figure 2:
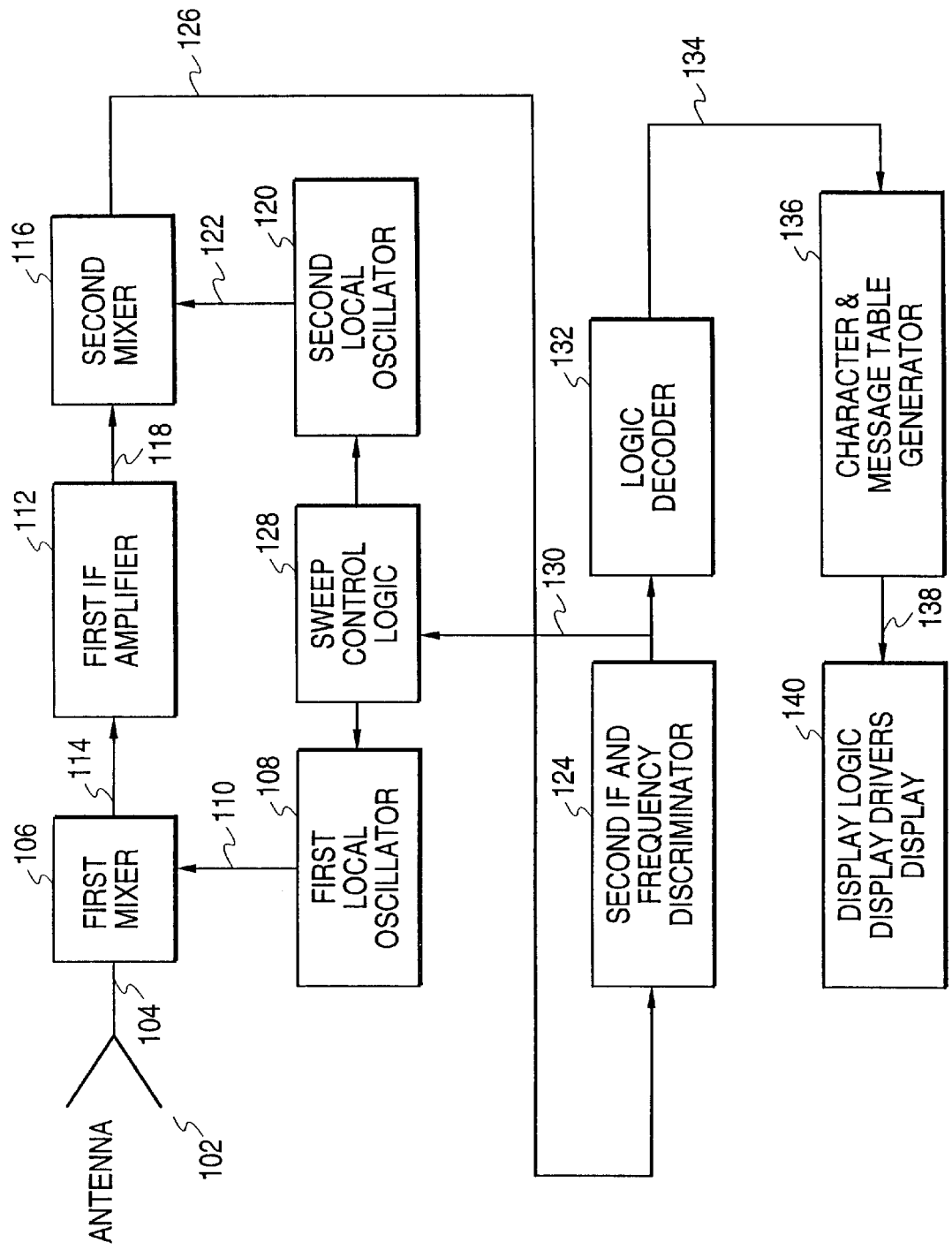
FIG. 2 is a block diagram showing a customized receiver which can be used in accordance with the invention.

When an internal trigger signal is initiated on line 127 or an internal trigger is initiated by a timer or other means to be described, the transmitter first sends a 0.5 second CW marker carrier to allow the radar detector to find the center frequency for safety warning transmission as discussed further herein relative to FIG. 2.

Two types of messages, fixed text and variable text messages, are used with the safety warning receiver according to the invention. Typically, a fixed text message is a character string that is programmed into and normally resides in a memory in a receiver with a message decoder, for example as shown in FIG. 2. A fixed text message is called up for display from the receiver's memory when the receiver recognizes a code word transmitted from the safety warning receiver. A variable text message is a string of characters transmitted from the safety warning transmitter, the character string itself forming a message for display by the receiver with a message decoder, as shown in FIG. 2. Upon receiving a variable text message, the receiver displays the message received rather than retrieving a preprogrammed message from memory.

FIG. 3A shows one format that can be used for message data-transmission. Referring to FIG. 3A, the 0.5 second CW marker 302 is immediately followed by a first message block 304 which is, for example, 32 bits in length. FIG. 3A also shows an exemplary configuration for such a message block using three data fields. Other message blocks can be employed while remaining within the scope of the invention.

In FIG. 3A, Field 1 is a 12 bit header transmitted after the CW marker. Each header bit has the value of '1'. The total of 12 bits requires six milliseconds to transmit, with a typical bit time of 0.5 milliseconds.

Field 2 contains the first data relating to the message being transmitted. FIG. 3A shows that a start bit (bit 0 of Field 2) is transmitted at the beginning of this field. The message is defined by the 5 or 6 bits after bit 0, depending on message type, since bit 6 of the data field can serve one of two functions. Bit 6 may be part of the message word or may be used to indicate the format of the message to be received, as in the case of a two bit message format indicator. Bit 7 of the message field is a message format indicator bit.

When a '0' is specified as the format indicator bit in Field 2, the message is either a variable-length message or an alternative function, such as a customized future growth function. However, as discussed further herein, a format indicator in Field 3 must be also read before the true function can be determined. If a '0' appears in the format indicator bit position in both Field 2 and Field 3, the Field 1 and Field 2 data block is the character count of variable-length message that follows. The character count may have a value between zero and sixty-three thereby accommodating message of up to sixty-four characters. Systems with more than sixty-four character messages can be designed within the scope of the invention. If the data represent the character count of the variable length message, the value is transmitted twice, once in the data block of Field 2 and again in the data block of Field 3. FIG. 3B is a truth table summarizing the message indicator logic.

Bit pattern '1' in the 7th data bit position (MSB) of Field 2 represents that the previous 6 bit "word" is a fixed-text message reference or index number. The detector logic, upon detecting a logic level '1' in the MSB position decodes the previous 6 bits and displays the fixed text message that is indicated as further discussed herein. A value of decimal '1' is added in detector logic of a receiver to the binary count so that the message reference number is between the values of 1 and 64, inclusive. Bit pattern '0 in the 7th data bit position (MSB) of Field 3 instructs the detector logic that there is a second fixed-text message to be appended to the first fixed-text message after transmission of the first fixed-text message.

Bit 8 of Field 2 is a parity bit, for example, odd parity can be specified. The parity bit is followed by a stop bit signifying the end of Field 2 of the message block. The stop bit always has the same logical value. For example, a logical one is shown in FIG. 3A for the stop bit.

Field 3 of the Message Block begins with a fixed value start bit, e.g. logical '0'. The next six bits in Field 3 are data, with the least significant bit transmitted first. Bit 7 of the data field is the most significant bit (MSB) of data and serves as a data type indicator. A logical '1' in the data type indicator signifies that the previous six bits is the fixed-text message reference and is a repeat of the fixed-text message indicated in Field 2. A logical '0' in the data type indicator signifies that the previous six bits is a fixed-text message reference and that this field text message is a second message to be appended to the first, after the display of the first. For example, if the fixed-text message reference in Field 2 equated to index number 01 and the fixed-text message reference in Field 3 equated to index number 11, the first message would read "Work Zone" and would be immediately followed by the message "Obstruction in Road."

When the message format bit pattern of '0' is indicated in the message format indicator of Field 2, a variable length text message is indicated. When a variable length text message is indicated, the 6 data bits in Field 3 contain a repeat of the count of characters, including spaces in the variable length text message that will follow. A value of decimal '1' is be added, in detector logic, to the binary count so that the character count is always between the values of 1 and 64, inclusive.

When the data type is '0' in Field 2 and '1' in the data type position of Field 3, a future growth function is specified. The future growth function that is indicated will have a value between '0' and '63' and can be used to accommodate future growth functions to be defined, such as customized functions for various users or other communication functions. For example, non-safety hazard warning messages could be transmitted at a lower priority than safety hazard messages, as a custom function. In another example, dedicated communications to official vehicles could be implemented as a custom function. The 8th bit is used as a parity bit, e.g., odd parity, and is followed by a stop bit of a defined logical value, e.g., logical one.

Figure 3C:
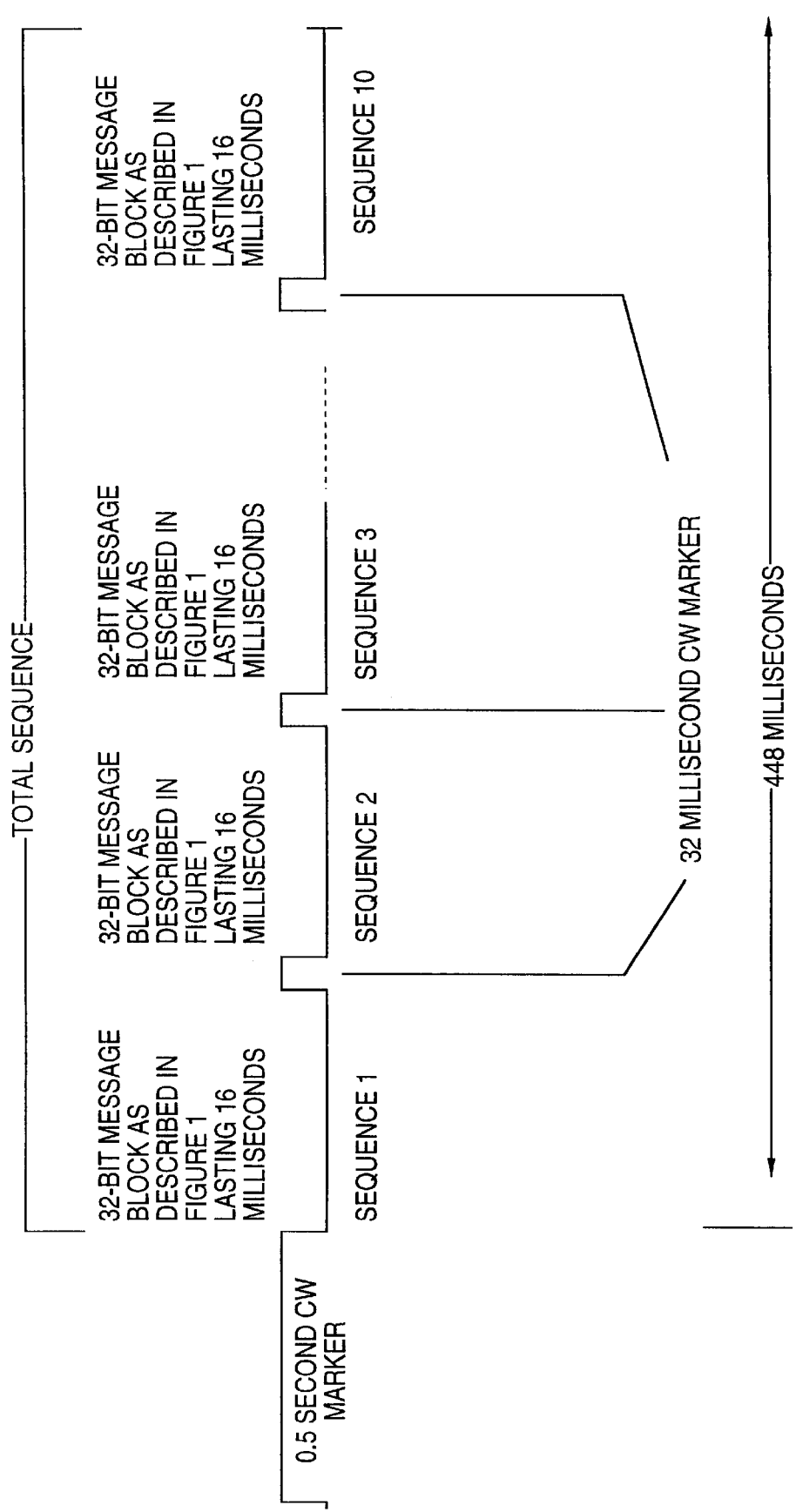
FIG. 3C illustrates a fixed length message sequence.

The CW marker and fixed-text message reference sequence are repeated, for example, a total of nine times following the transmission of the first CW marker and message block. FIG. 3C shows a format that can be used to repeat the fixed-text message block. In FIG. 3C the transmission sequence is the same as previously described for FIG. 3A except that the CW marker is transmitted for a period of only 32 milliseconds each repetition cycle.

Downward compatibility with conventional radar detectors, such as radar detectors that detect the presence of a police radar but do not have the message interpretation capability of the receiver in FIG. 2, is achieved during the transmission of the 0.5 second duration CW marker. The CW marker is detected by conventional radar detectors which respond by triggering an alarm.

The time required to complete an entire fixed message reference transmission from the start of the 0.5 CW second marker to the final repetition of the reference is 948 milliseconds. The safety warning transmitter is silent for a period of 52 milliseconds after the total transmission sequence of the fixed-text reference has been completed.

Figure 3D:
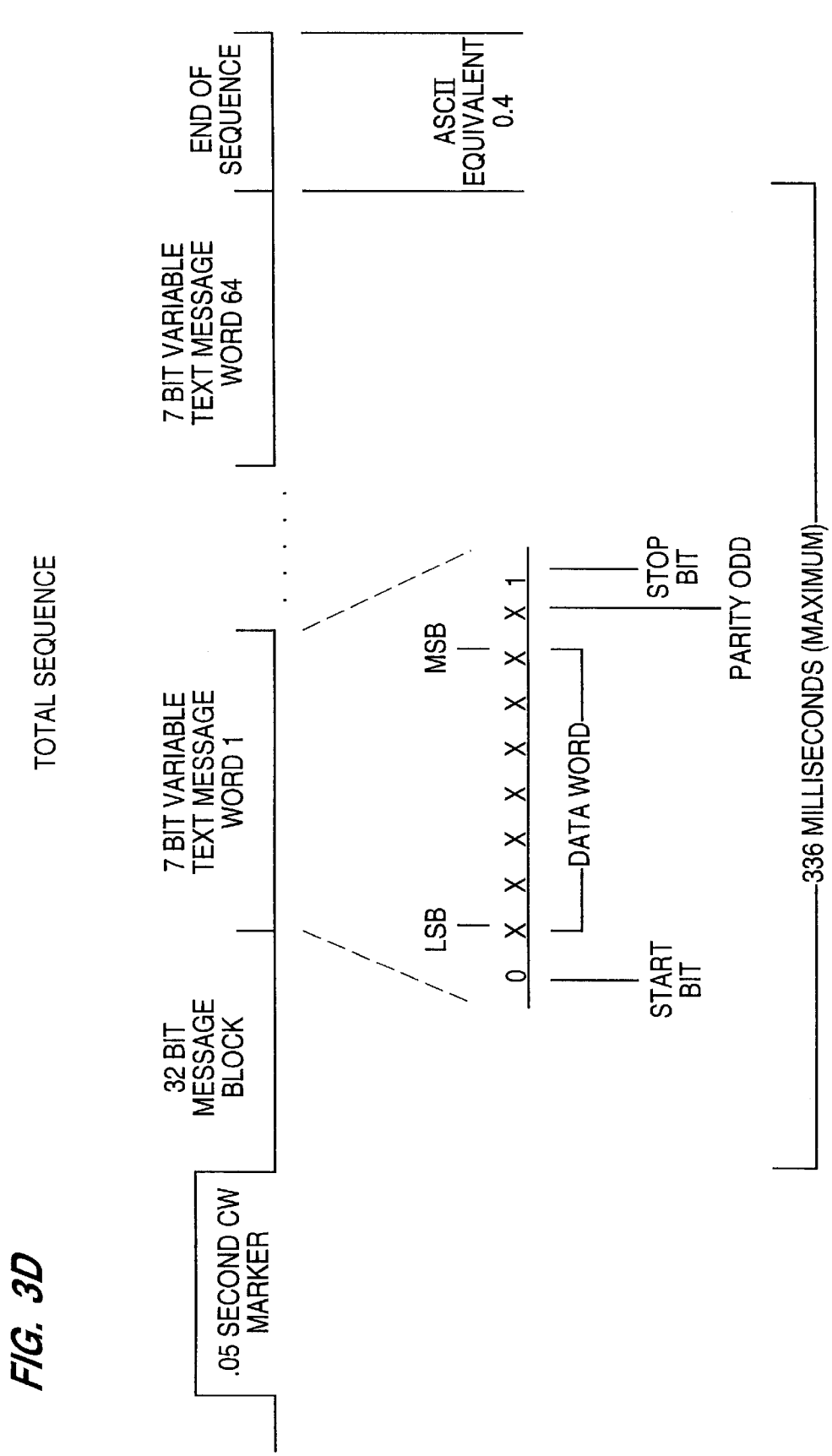
FIG. 3D illustrates a variable length text message.

Following the transmission of the message block showing in FIG. 3A, the count of characters to be transmitted is resident in detector memory. However, at this point no characters have yet been transmitted. FIG. 3D shows a format that can be followed for the transmission of each character making up a variable-length message. In FIG. 3D, a start bit, e.g. having a value '0', is first transmitted. The start bit is followed by a data word, e.g., seven bits with the LSB first, that can represent any ASCII character that can be represented by a seven bit word. The next bit is a parity bit that shall always be the same parity, e.g., odd parity. The bit following the parity bit is a stop bit that having, e.g., a value of '1'.

The time required to transmit each character typically is 5 milliseconds. The entire transmission sequence of a variable length message from the beginning of CW marker to the end of the 64th character requires up to 836 milliseconds. The transmission sequence will be shorter if fewer than 64 characters are used in the transmission. Upon completion of the last character to be transmitted in a variable-length message sequence, an end of sequence (EOS) pattern can be transmitted. The bit pattern of the EOS, including the start, parity and stop bits can constitute two words totaling 20 bits and equal a hexadecimal code, e.g., the code for the characters '0' and '4' transmitted in that order. The safety warning transmitter then goes silent after transmission of the EOS until a total of 999 milliseconds have passed since the start of the 0.5 second CW marker transmission. Within a one-second sequence the variable-length message is not repeated. The CW marker frequency of each safety warning transmitter according to the invention can be set to 24.100 GHz in order to be detectable by conventional radar detectors. The sweep time across the 5 MHz frequency excursions between 2.5 MHz above and 2.5 MHz below the CW marker frequency can be set to 0.5 milliseconds. One bit is transmitted every 0.5 milliseconds, except when the CW marker carrier is present. There is no space between bits except when the cw marker carrier is present. The bandwidth of modulation is 5.0 MHz. A receiver with message decoding capability, such as that shown in FIG. 2 discussed further herein, will stop frequency scan upon the detection of any signal within the 24.075 GHz to 24.125 GHz band. If no header data is received with 0.5 seconds, the detector can ensure that any detected signal is not a safety warning transmitter.

FIG. 1 also shows timer module 133 connected to microwave transmitter source 101. Timer module 133 can be used so that the safety warning system is turned off during periods when no warning is needed. For example, when the safety warning system according to the invention is being used in a construction zone which is removed at night, the timer module can be programmed to activate safety hazard warning transmitter according to the invention only during hours when the work zone is occupied.

A radar detector or receiver can be constructed as a broadband receiver, a channelized device or as a scanning device. FIG. 2 is a simplified diagram of a receiver and logic decoder including a detector circuit that can be used to decode and display a safety warning message from a transmitter according to the invention. The signal from the safety warning transmitter is first received by the radar detector's antenna 102 and transferred, via line 104 to the first mixer 106 which also serves as a detector. The signal from the first local oscillator 108 goes to the mixer 106 via line 110. The difference or intermediate frequency (IF) is formed in mixer 106 as the product of the received signal and the signal from the first local oscillator 108. The IF signal is sent to the first intermediate frequency amplifier 112 via line 114. The first IF amplifier 112 amplifies the intermediate frequency and sends the amplified signal to the second mixer 116, via line 118. An output of second local oscillator 120 is fed to the second mixer 116, via line 122. The difference frequency signal, formed in second mixer 116 between the signal from second local oscillator 120 and the first IF signal on line 118 goes to the second IF amplifier and frequency discriminator circuits 124 via line 126. The control logic 128 can control the sweep of local oscillators 108 and 120 and will stop the scan of the first or second local oscillator upon detection of a CW marker signal transmitted by the safety warning transmitter. One function of control logic 128 is to control the sweep of the second local oscillator 120 to sweep across the radar band. Feedback on line 130 from the frequency discriminator 124 is fed to the control logic 128. When the CW marker signal from the hazard warning transmitter shown in FIG. 1 is detected between the frequency range of 24.075 Ghz and 24.125 Ghz, the control logic circuit 128 stops the sweep and centers the signal from the safety warning transmitter in the second IF amplifier using the feedback provided on signal line 130.

Once the CW marker is centered, the system is ready for the safety warning transmitter to begin transmitting data in the form of a modulated signal as previously mentioned. When the safety warning transmitter sweeps across the frequency at which the receiver is stopped, the frequency discriminator produces a voltage output. The amplitude of the voltage output from the frequency discriminator 124 on line 130 is directly proportional to frequency. The higher the safety warning frequency above or below the at rest frequency of the radar detector, the greater the output from the discriminator. The logic decoder 132 converts the amplitude information on line 130 into logic levels. When a low to high frequency transition occurs, the Logic Decoder 132 outputs a logic level '1' on line 134. If a high to low frequency transition occurs a logic level '0' is output on line 134.

Using the frequency transitions to form logical 1's and 0's, a digital word is developed. For example, when ten logic level bits have been received, a seven bit word preceded by a start bit and followed by a parity bit and a stop bit can be formed. This word is decoded by the character and message table generator 136. The character and message table generator 136 may call one of a plurality fixed-text messages, e.g. sixty-four messages, from a memory (not shown) in the radar detector as a function of the bit pattern in the seven bit word. Each fixed-text message recalled from detector memory may, for example, be up to sixty-four bits long, counting spaces and is stored in the radar detector permanent memory as a complete message.

The safety warning transmitter according to the invention also has the capability of sending messages that are not fixed-text messages permanently stored in radar detector memory. Such variable-text messages are transmitted one character at a time by the safety warning transmitter. In a variable text message, each character may, for example, comprise ten bits: a start bit, followed by 7 data bits, followed by a parity bit, followed by a stop bit. Each of the 7 data bits represents an ASCII character. By way of example and not limitation, the safety warning transmitter may transmit up to 64 characters in a variable-text message.

After transmission and decoding of the message the character message generator 136 outputs the message on line 138 for display. The digital information is sent to the display logic 140, which converts the message into a bit stream for display by the associated logic drivers and finally into human readable form via the display.

Those skilled in the art will recognize that the receiver block diagram can be realized in several ways. For example, the first and/or second local oscillator may be swept to find the CW marker transmitted by the safety warning transmitter. Once located, there are many rates at which the data can be transmitted, and the receiver can begin decoding the transmitted information. There are several methods that can be used to determine if a logic level '1' or '0' has been transmitted by the logic decoder 132 during the decoding of output from the frequency discriminator 124 on line 130. For example, two voltage comparators may be used. The order of triggering of each of the two comparators would determine if a '1' or '0' had been transmitted. Alternatively, an analog to digital converter could be used to digitize the amplitude of the voltage output from the frequency discriminator 124. A micro-processor used in the radar detector for band scan control could determine if a bit is a '1' or '0' by using a Boolean logic test on the digitized data. Further, the data may be stored and sorted in radar detector memory controlled by a microprocessor using known techniques.

Figure 4:
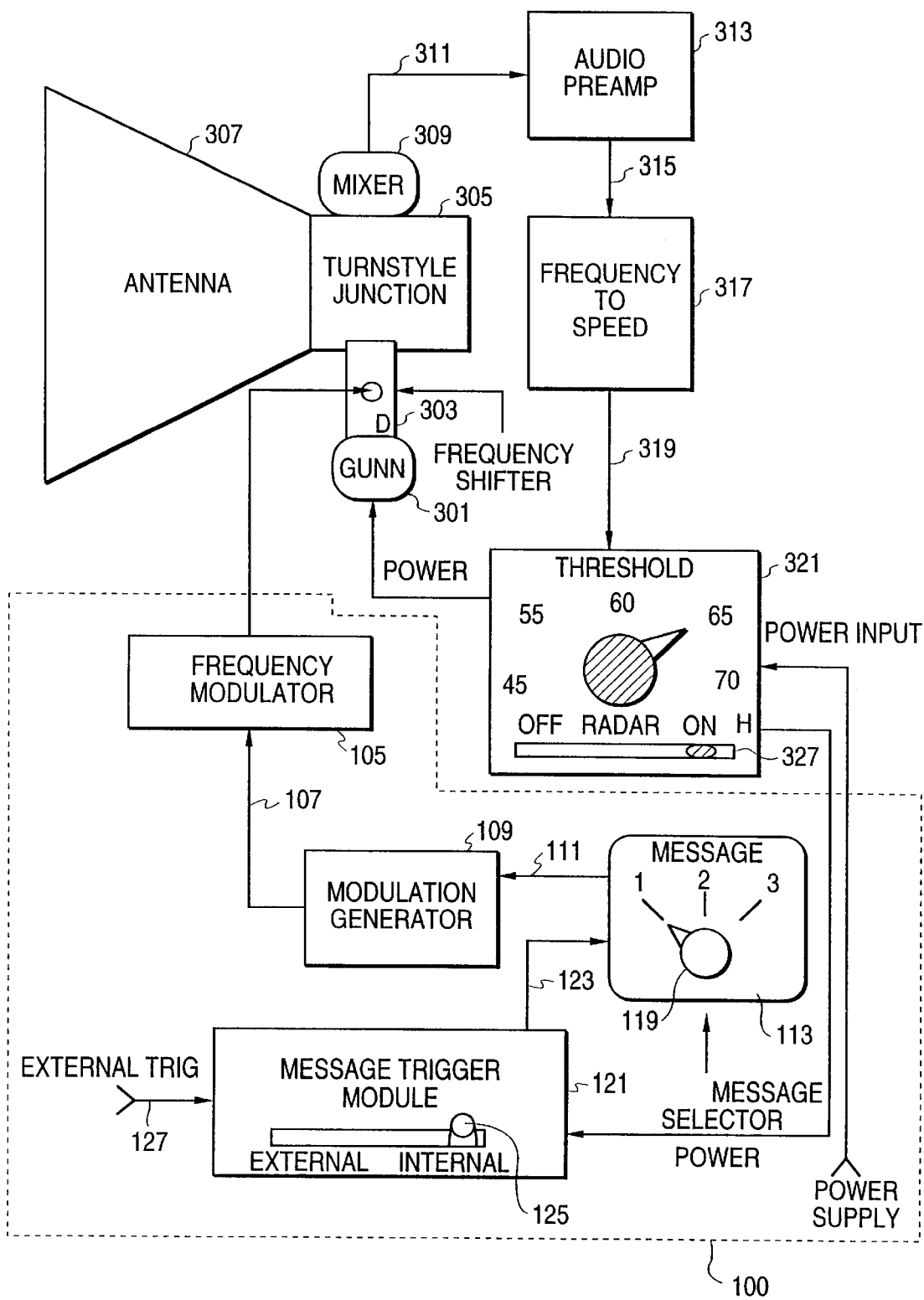
FIG. 4 is a block diagram illustrating a system in which a radar is used as a cuing device for activating a safety message transmitter.

FIG. 4 illustrates a system according to the invention in which a police radar function is integrated with the fundamental safety warning transmitter and used as a cuing device to start a hazard warning message when an approaching vehicle exceeds the speed threshold set by the user. In this case, the hazard warning message is transmitted when the speed of the vehicle detected exceeds a selected speed, such as the posted limit or other speed considered safe for prevailing road conditions. Rather than providing continuous transmission of the hazard message, the message is only transmitted when needed, thereby ensuring that the radio frequency spectrum is not polluted by a constant transmission. In the example shown in FIG. 4, the homodyne transmitter is modified to serve as a radar warning cuing system and as the primary transmitter of a safety warning system according to the invention. In a similar manner, the police radar function can also be used to detect the presence of a vehicle to activate the transmitter or monitor the density of traffic flow and enable the transmitter under selected traffic conditions.

As shown in FIG. 4, an output from a Gunn oscillator 301 in one of the police radar bands is equipped with a frequency adjuster. For example, a varactor diode 303 can be used to control the frequency of the gun oscillator. The frequency modulated signal is then routed to an input port of a turnstile junction 305. The output port of the turnstile junction provides the RF signal from the Gunn oscillator to the antenna 307 for broadcast. During the radar operation mode, the radar function can be activated during the 0.5 second CW marker transmission. Thus, the transmission for the radar function is a CW carrier. It is also possible that the radar transmission period be greater than the CW marker period of 0.5 seconds.

A small amount of power is routed to mixer 309 to serve as a reference. Power reflected from objects radiated by the transmitted beam is received as returns in antenna 307 and routed to the mixer port of turnstile junction 305. In mixer 309, the signal is mixed with the reference to produce the sum and difference of the received and reference signals. The sum portion of the received and reference signals is filtered out, while the difference portion is routed via line 311 to amplifier 313. As is known in the art, the return from an object showing no motion appears as a direct current (DC) level while the returns from an object in motion are doppler shifted from the transmitter frequency by an amount determined by the following formula:

$$D_f = \frac{2V * F}{c}$$

Where:

$D_f$=doppler frequency in hertz
V=target velocity in meters per second
F=the transmitter frequency in hertz
C=the speed of light.

The doppler shift for vehicle targets is within the audio range at the expected frequency of operation. Therefore, amplifier 313 is an audio amplifier. The resultant doppler shifted signal is sent to the audio amplifier 313 for amplification. The amplified doppler shifted signal is then routed over line 315 to discriminator 317, which converts the frequency to a voltage representative of the speed of the vehicle. The higher the speed of the vehicle the higher the voltage. It will be known to those of ordinary skill that other methods such as Fourier transform techniques can be used to produce such voltages. As used herein, the term "discriminator" is intended to include such other methods. The voltage representing the speed of the vehicle is routed over line 319 to a threshold circuit 321. The threshold is adjustable to a voltage representing vehicle speed using adjuster 323. In response to the setting of adjuster 323, the reference voltage representative of the speed setting can be provided to a comparator. The voltage on signal line 319 is then compared with the reference voltage representing the speed threshold set. When the voltage representing the speed of the vehicle exceeds the reference setting, power is applied to the hazard warning control circuits via signal line 325, thereby activating a message generating transmitter 100 as discussed in FIG. 1 and shown generally at 100 in FIG. 4.

Threshold circuit 323 also has a switch 327 which allows the cuing function to be turned off or allows operation in the radar mode only.

In the system previously shown in FIG. 2 the receiver scans across a frequency range between 24.075 Ghz and 24.12 Ghz. If a CW marker signal is detected in this range, the receiver shown in FIG. 2 stops scanning and centers the detected signal with the bandpass of the second IF amplifier. The receiver's scanning remains stopped until a frequency modulated signal is detected transmitting the data bits of '1' and '0' or a timer tells the receiver logic to begin scan again. The transmission of a CW marker causing the receiver to stop scanning upon detection of the marker is unique. The CW marker provides a frequency reference signal that allows the receiver to "lock" to the frequency around which frequency modulation indicating data being transmitted will occur. This technique according to the invention eliminates the need for the receiver to have precise frequency calibration and eliminates the effects of first and second local oscillator frequency drift due to temperature off-set in the radar detector.

Figure 5B:
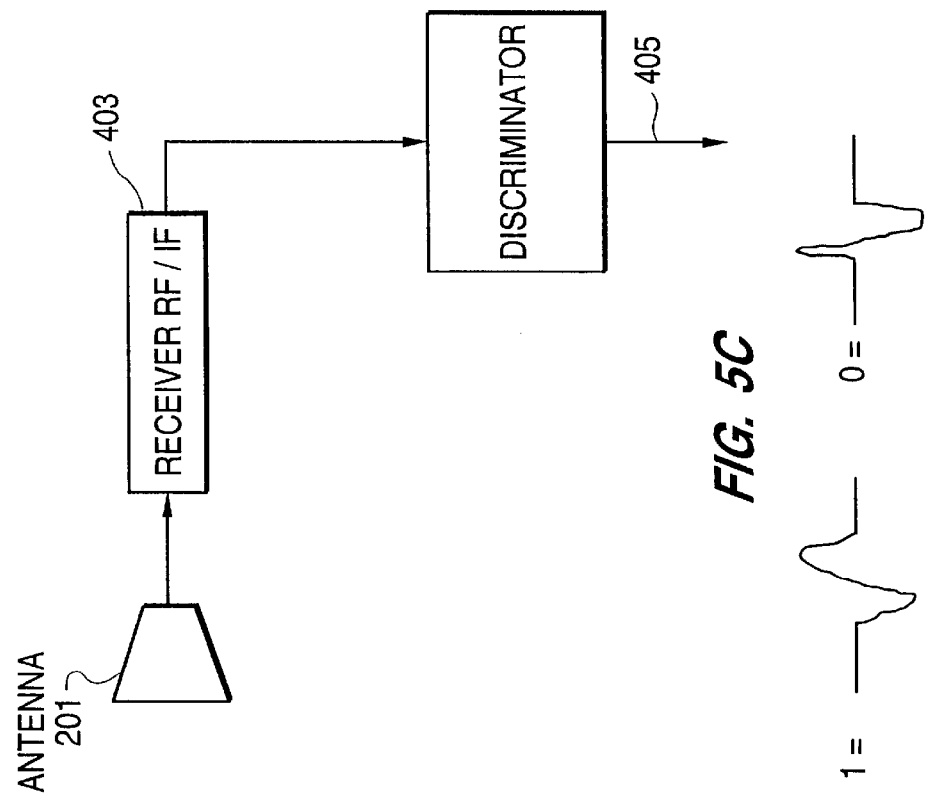
FIG. 5B is a high level block diagram of a receiver according to the invention.
Figure 5C:
FIG. 5C shows an "S" shaped pulse developed in the receiver.
Figure 5A:
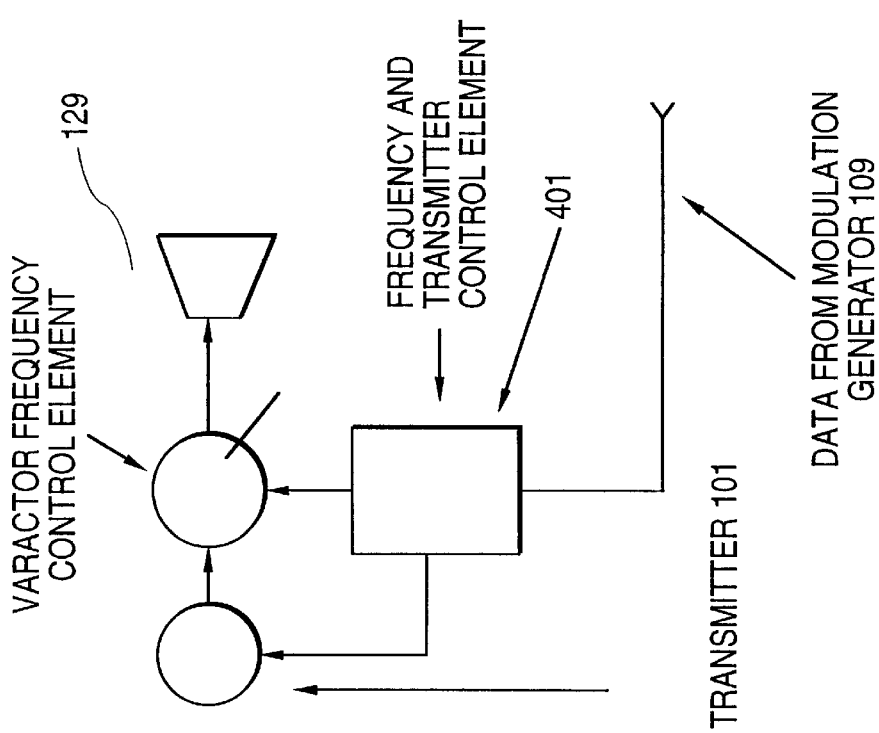
FIG. 5A is a high level block diagram of a transmitter according to the invention.

According to the invention, as shown in the simplified diagram in FIG. 5A, the transmitter frequency is swept across a band that includes the nominal tune frequency of the radar detector or the receiver shown in FIG. 5B, as well as the range over which the tune frequency of receiver or radar detector is expected to drift, for example a 5 MHz band. Sweeping this entire frequency band (e.g., 5 MHz) guarantees that the radar detector or receiver sees the transmitted signal even when its tuned frequency varies from its nominal frequency setting.

Assuming a sweep rate of one bit every 0.5 milliseconds, 2,000 thousand bits of data can be transmitted each second. However, the CW marker is transmitted for a period of 0.5 seconds. When the fixed-text format message is transmitted as shown previously in FIG. 3C, nine additional CW markers, each having a period of 32 milliseconds are also transmitted. Thus, data transmission only occurs for a period of 160 milliseconds out of each second.

A conventional radar detector sweeps the frequency band of interest at a much faster rate than the sweep used to transmit the data in the safety warning system. Thus, the discriminator time constants and low pass filters used in a conventional radar detector will also operate in an enhanced receiver with message capability, as shown in FIG. 2. Lowering the sweep rate while maintaining the above described ratio of the sweep rates would accommodate radar detectors employing low pass filters with lower cut off frequencies.

Figure 6A:
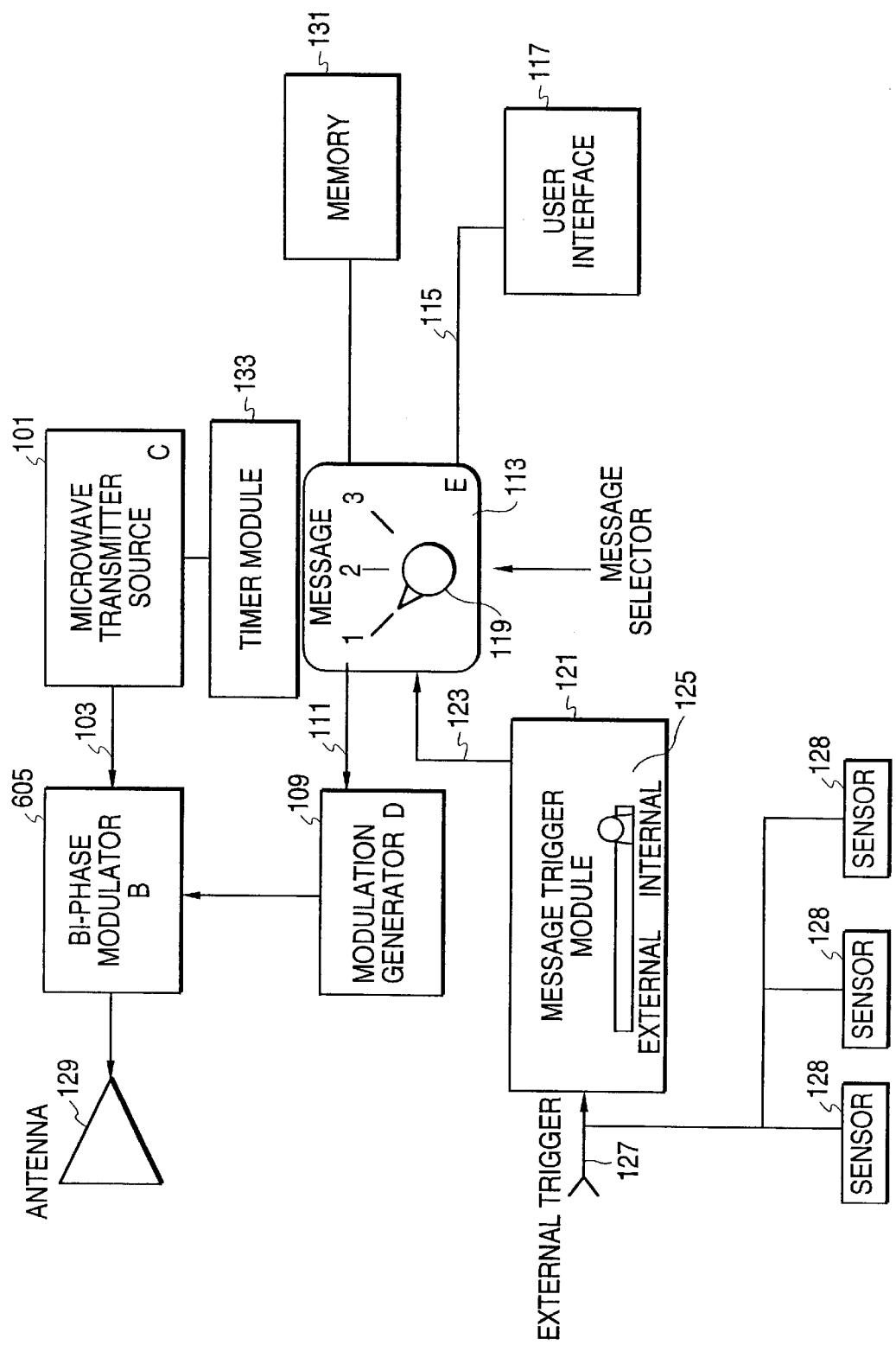
FIG. 6A illustrates a transmitter according to the invention using bi-phase modulation to encode a message.

FIG. 6A illustrates an alternative transmitter configuration in which frequency modulator 105 is replaced with bi-phase modulator 605. Bi-phase modulator 605 controls the phase of the transmitted signal in response to information it receives on line 107 from modulation generator 109. The microwave signal received from the transmitter 101, which is phased modulated by bi-phase modulator 105 is broadcast through antenna 129. It will be known to those of ordinary skill that appropriate amplifiers and filters and other conventional transmitter and modulation circuits may be required to achieve desired signal levels and frequency ranges.

Modulation generator 109 sends instructions to bi-phase modulator 605 to produce signals having a first phase modulation and a second phase modulation. In one embodiment, the first phase modulation can represent a first logical state, while the second phase modulation can represent a second logical state. In another embodiment, transitions between phase modulations can be used to represent one logical state while an absence of transitions in phase can be used to represent a second logical state. For example, a logic level 0 (low) from modulation generator 109 represents a state in which the phase of the microwave transmitter source 101 is propagated into space through antenna 129 with no change in the transmitted signal being affected by bi-phase modulator 605. When the message on line 111 requires generating a logic level 1 (high), modulation generator 109 sends a signal on line 107 to bi-phase modulator 605 enabling bi-phase modulator 605 to shift the phase of the transmitted signal 180 electrical degrees. The modulation pattern representing logical ones and zeros represents a message code or message, as previously discussed herein. A transmitter employing bi-phase modulation can also be used in the system of FIG. 4, previously discussed herein.

In order to assure detection of the logical states of each bit of the message, modulation generator 109 modulates the phase at a rate to guarantee a phase change will be detected in one bit period. For example, at a bit transmission rate of 2000 bits/sec, the receiver must sweep the possible frequency range within the 0.5 millisecond period of a bit. The proper phase modulation for the logical state of each bit must be maintained by the warning transmitter during the period to assure detection.

The bi-phase modulation applied to the microwave signal through bi-phase modulator 605 is applied at a rate such that the modulation sidebands and the suppressed carrier produced by a bi-phase modulated signal trigger a conventional radar detector. As a result, the signal rejection logic of current generation radar detectors does not reject signals transmitted by the safety warning transmitter according to the invention. Instead, current generation radar detectors will receive and respond to signals from the safety warning transmitter by generating the same alarm signal currently generated when the receiver is radiated by a police radar.

Figure 6B:
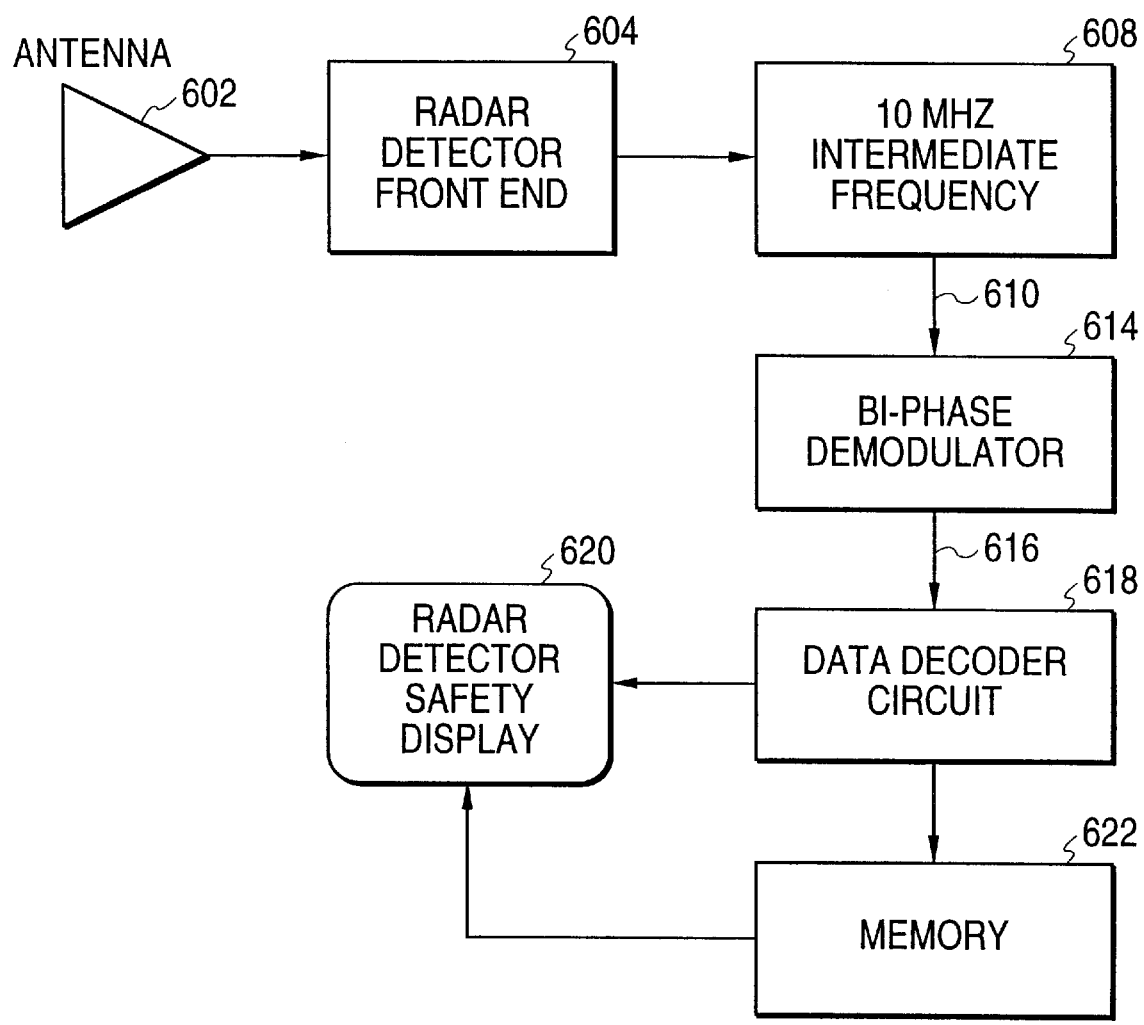
FIG. 6B illustrates a receiver for use with the transmitter of FIG. 6A.

FIG. 6B shows a next generation receiver, which is customized to detect messages or message codes transmitted using bi-phase modulation by the safety warning transmitter according to the invention and provide the driver of the vehicle with an indication of the hazard being approached. Such a receiver includes an antenna 602 which provides the received signal to a radar detector front end 604. Radar detector front end 604 is of conventional design including a local oscillator (not shown) which sweeps the band of interest, in this case, the police radar band. Upon detecting a desired signal, the radar detector front end generates an intermediate frequency (IF) signal on line 606, which is then routed to an IF amplifier such as 10 MHz IF amplifier 608. If amplifier 608 is typically 1 MHz wide.

In operation, when the radar detector front end 602 detects a signal, a microprocessor or other circuitry (not shown) centers the signal in the IF bandpass, which is approximately 1 MHz wide using techniques such as those previously discussed herein with respect to FIG. 2. The output of IF amplifier 608 is then routed through signal line 610 to conventional phase lock loop demodulator circuit 614. Each time the phase of the signal transmitted by the safety warning transmitter, such as that shown in FIG. 6A, varies, an error signal is generated by the phase lock loop demodulator. When the signal changes by 180 electrical degrees, the error voltage from the phase detector is a maximum until the voltage control oscillator (not shown) in the phase lock loop circuit reacquires lock on the signal. According to the invention, each time a 180 degree transition occurs (the error voltage achieves a maximum), a predetermined logic level, such as a logic level 1, is generated. The logic levels are transmitted over line 616 to a data decoder circuit 618, which decodes the message and transmits the decoded alphanumerics to the radar detector display 620. Alternatively, if the data decoder circuit recognizes the received message as a code sequence belonging to a predetermined code, data decoder circuit 618 retrieves the corresponding message from memory 622 and routes the message to the radar detector display 620.

The use of bi-phase modulation in the safety warning transmitter produces a highly frequency and amplitude stable single signal within the radar band, which appears as a police radar to those radar detectors that do not have the capability of decoding the message in the safety warning transmitter signal. Further, bi-phasing coding allows any number of unique warning messages to be transmitted.

As previously discussed herein, a system according to the invention employing frequency modulation can employ a CW marker signal which is used by the receiver to center the received signal in the IF passband. This approach, which facilitates detection, can also be applied to a bi-phase modulated system as disclosed in FIG. 6A. In such a system, after the CW marker is detected and the IF signal is centered, the signal is monitored for phase modulation to extract the information content.

Figure 7:
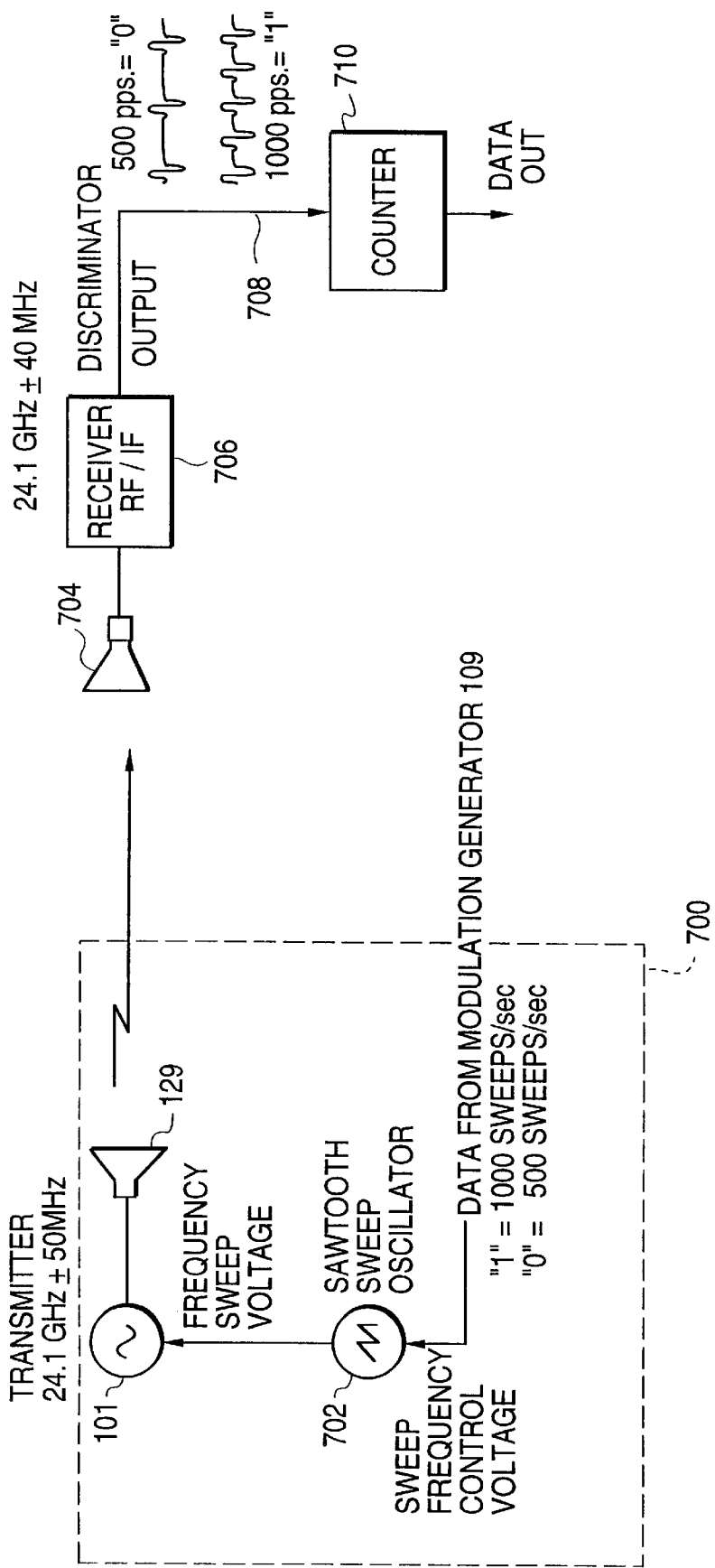
FIG. 7 is a block diagram illustrating a transmitter in which a first sweep rate indicates a first logical state and a second sweep rate indicates a second logical state.

FIG. 7 illustrates a system using an alternative modulation to the bi-phase modulator 605 in FIG. 6A. The system previously shown in FIG. 6A assumes that the safety warning system operates at a relatively fixed frequency which is phase modulated as a means of transmitting the data. However, the frequency stability of some radar detectors may not be adequate to operate in an ordinary phase modulated or frequency modulated mode, thereby affecting downward compatibility . The system in FIG. 7 does not require frequency stable receivers nor impair operation of current generation radar detectors which do not have the ability to interpret messages.

According to the invention as shown in FIG. 7, data from the modulation generator is used to control the sweep rate of a sawtooth sweep oscillator 702. The sweep oscillator 701 then is used to control the frequency transmitted by the microwave transmitter source 101 through antenna 129. The broadcast message is received by receive antenna 704 and provided to conventional receiver RF/IF circuitry 706 including a discriminator (not shown) to produce a voltage on discriminator output line 708. A conventional radar detector or the advanced radar detector shown in FIG. 2 can be used. When the safety transmitter 700 sweeps across the receiver's tuned frequency, the frequency discriminator in receiver RF/IF circuitry 706 outputs a conventional "s" shaped pulse. An example of such an "s" shaped pulse is shown in FIG. 5C. A counter circuit 710, such as a computer, counts the number of pulses received in a fixed time interval.

According to the invention, the sweep rate at which sawtooth sweep oscillator 702 causes the microwave transmitter source 101 to sweep over the frequency band depends on the output from the modulation generator 109. A linear ramp circuit can be used to generate a linear sweep over the frequency band at a desired rate. For example, a conventional ramp circuit generating a linear output voltage can be used to control a sweep generator to sweep the band at a correspondingly related rate. A first sweep rate is used to indicate a first logical state, while a second sweep rate is used to indicate a second logical state. For example, a high sweep rate in the transmitter results in a high number of pulses detected by counter 710 in the receiver. Such a high number of pulses received in a predetermined time interval can be used to indicate a logical one. A low sweep rate results in a smaller number of pulses being counted by counter 710 in the receiver. This lower number of pulses within a predetermined period of time can be used to indicate a logical zero. Averaging the number of pulses detected over a predetermined time interval eliminates the need for synchronizing the count interval to the sweep rate of the transmitter.

By way of example and not limitation, assume that the receiver RF/IF circuitry 706 will remain tuned within an 80 MHz band around its nominal frequency under all conditions. Configuring sawtooth generator 702 to sweep the transmitted frequency over a slightly wider band around the receiver frequency, for example 100 MHz, guarantees that during each sweep of the transmitter, the receiver's frequency discriminator will produce an output pulse. As previously noted, the sweep rate is set depending on the logical state commanded from the modulation generator 109 for each bit of a message. For example, 1,000 sweeps per second could be assigned to represent a logical 1 and 500 sweeps per second could be assigned to represent a logical 0. The counter circuit 710 in the receiver is configured to count for an interval that allows distinguishing between logical 1 and logical 0, based on the average count. In the present example, if the counter circuit counts over a 10 MHz interval before deciding whether a bit being transmitted is a logical 1 or a logical 0, it averages the count over at least five pulses. The correct decision is made even though the count interval is not synchronized with the sweep rate of the transmitter. At the end of the ten millisecond count interval, the counter is reset and the count begins again.

Radar detectors currently in use sweep the frequency band to locate a conventional police radar transmitter transmitting at a fixed frequency. Since the transmitter according to the invention as shown in FIG. 7 also sweeps in frequency, it is necessary to consider the compatibility of the transmitter and receiver in order to assure that conventional alarm and new radar detector designs decode the transmitted message. According to the invention, the safety warning transmitter in FIG. 7 sweeps at a rate faster than the sweep rate of the receiver and over a smaller frequency range. This higher sweep rate over a narrower frequency range in the transmitter than that of the radar detector assures that the radar detector intercepts the transmitted signal and produces the output pulses from its discriminator causing the radar detector to alarm in a conventional manner.

The system shown in FIG. 7 can also employ a CW marker signal to ensure that a conventional radar detector of a detector such as that shown in FIG. 7 locks on to the hazard warning signal.

FIG. 8 shows still another embodiment with an FM transmitter 8a incorporating a conventional sweep oscillator and microwave source to transmit a frequency swept signal to antenna 129. The data modulation on signal line 803 is generated from a modulation generator as previously discussed to reflect the bits of a message to be transmitted by the transmitter. In this embodiment, as discussed further herein, the direction of the frequency sweep across the full range of receiver uncertainty is used to encode the information to be transmitted and a CW marker signal is not used.

On the receiver side, signals are received by antenna 801 and transmitted to receiver 803 which outputs a signal on discriminator output 805 as previously discussed. The discriminator voltage is applied to a detector circuit 807 through an AC coupled circuit 809. The output of detector circuit 805 corresponds to the data bits of the message.

In operation, the frequency of the transmitter 801 is linearly swept over the full range of the frequency uncertainty of the receiver during each bit time. As the transmitter frequency passes through the tuned frequency of the receiver, the receiver frequency discriminator produces a typical bipolar "s" shaped output signal such as that shown in FIG. 9b. The data information showing whether a 1 or a 0 was transmitted is determined by the direction of the frequency sweep. For example, sweeping from a lower frequency to a higher frequency causes receiver 803 to produce a first polarity discriminator output on signal line 805. This first polarity signal represents a first logical state, such as a logical 1. To represent a second logical state, such as a logical 0, the direction of the frequency sweep is reversed, thereby causing the discriminator output on signal line 805 to have the opposite polarity. Detection circuit 807 detects the polarity of the signal on the discriminator output 805 and assigns the corresponding logical state through the bit.

As shown in FIG. 9b, the discriminator outputs a bipolar sinusoid like output signal whose duration is equal to the time needed for the frequency of the transmitted signal to sweep through the bandwidth of the receiver3 s IF amplifier. Assuming the data rate is 1,000 bits per second, the desired range of frequency is swept over 1 millisecond period, as shown in FIG. 9a. The frequency is swept over the range of uncertainty of the receiver. FIG. 9a shows an example in which the receiver uncertainty is 20 MHz and the transmitter frequency is swept over this 20 MHz range in the 1 millisecond period corresponding to a bit time where 1,000 bits per second is the data rate. If the IF bandwidth of receiver 803 is 500 MHz, the discriminator output signal must have a duration of 25 microseconds. The 25 microseconds discriminator output signal is passed by a low pass filter built into receiver 803, which would typically have a cutoff frequency of about 50 KHz. Capacitor 809 provides AC coupling to remove DC offset caused by frequency uncertainty of the tuned frequency of the receiver.

Detector circuit 807 receives an input signal 811 without DC offset. Detector circuit 807 can be formed with a pair of threshold comparators (810, 812), the first having a positive threshold and the second having a negative threshold. By determining which threshold is exceeded first, the polarity of the signal, and hence the logical state of the data bit can be determined. For example, in FIG. 9b and 9c when the discriminator output exceeds a positive threshold first, a logical 1 is assigned to the data bit and when the discriminator output exceeds a negative threshold first, a logical 0 is assigned to the data bit.

If a typical variable text message including spaces and special characters is 64 bits, and the data rate is 2,000 bits per second (1 bit per 0.5 milliseconds), the time required to deliver a message is 32 milliseconds, without a CW marker and header. Message presence is detected by message detector logic circuit 815, which is coupled either to signal line 811 or to the output of detector circuit 807 on signal line 813. Message detector circuit 811 simply determines if the received signal is periodic at the data rate. For example, when a pulse is received into circuit 815, a delay of slightly less than 1 millisecond is started. When the delay time is complete, the input to circuit 815 is examined again to see if another output pulse is present. Two repetitions of this test should be sufficient to verify the presence of the message signal. In this example, the time to detect the presence of a message signal would be 1.5 milliseconds.

As disclosed herein, a system according to the invention enhances safety, particularly under road conditions which require additional driver attention. Further, the system according to the invention is downward compatible to make use of existing radar detector infrastructure and can be deployed without a major reconfiguration of components thereof. As a result, the system according to the invention can perform important functions in an intelligent vehicle highway system.

A system according to the invention is downward compatible with existing radar detectors, as previously discussed herein, such that the existing infrastructure of radar detectors in vehicles can respond to safety warning messages described herein by triggering an alarm. A system according to the invention may also include a single receiving device responsive to safety warnings or other messages transmitted with any of the modulations discussed herein, while also being responsive to police radar signals to generate an alarm. Further, a transmitter according to the invention can be implemented with a receiver incorporated therein to monitor approaching vehicle speed or other traffic parameters, such as traffic volume, and transmit a message in response to the circumstances. Vehicles equipped with message capable receivers according to the invention previously discussed herein will display the message, while conventional radar detectors will generate an alarm.

Logic states described herein are by way of example and not limitation, as those of ordinary skill will recognize that opposite logic states can also be defined to represent the same conditions. Other embodiments of the invention will be apparent to those skilled in the art from consideration of the specification and practice of the invention disclosed herein. It is intended that the specification be considered as exemplary only, with the true scope and spirit of the invention being indicated by the following claims.

What is claimed is:

1. A radar transmitter comprising:
   a signal generator; and
   a controller, said signal generator being responsive to said controller to transmit a CW marker signal and codes for bits of a message being generated by modulation from said controller, said bits of said message being transmitted after said CW marker signal turns off, said CW marker signal having signal characteristics for detection by a receiver having a message decoder for decoding said message and by a conventional radar detector unresponsive to said codes, wherein said controller comprises a sweep generator to frequency modulate said codes of said bits, wherein said sweep generator sweeps from a high frequency to a low frequency to represent a first logical state and from a low frequency to a high frequency to represent a second logical state of one of said bits.

2. The apparatus recited in claim 1 wherein said modulation generates sidebands insufficient to trigger signal rejection logic in said conventional radar detector.

3. The apparatus recited in claim 1, wherein said sweep generator sweeps at a first rate to represent a first logical state and at a second rate to represent a second logical state of one of said bits.

4. The apparatus recited in claim 1, wherein a predetermined pattern of said bits comprises a code for a predetermined message.

5. The apparatus recited in claim 4, wherein said code corresponds to a code stored in a receiver to retrieve said predefined message from a location in a memory where said predefined message is stored.

6. The apparatus recited in claim 1, wherein said signal generator outputs signals with frequencies in a range corresponding to a range of frequencies transmitted by conventional police radar.

7. The apparatus recited in claim 1, wherein said signal generator outputs frequencies in a range detectable by an automotive radar warning detector.

8. The apparatus recited in claim 1, comprising an antenna operatively connected to receive signals from said signal generator and to broadcast said signals.

9. The apparatus recited in claim 1, further comprising a receiver, said receiver receiving a signal reflected from said vehicle indicating said vehicle's presence and in response thereto generating an enable signal to enable said controller to generate said data, thereby producing logical states to form said message for transmission to said vehicle.

10. The apparatus recited in claim 9, wherein said receiver processes said signal reflected from said vehicle to determine if said vehicle is exceeding a predetermined speed.

11. The apparatus recited in claim 10, wherein said receiver processing said signal detects a doppler shift in frequency to determine if said vehicle exceeds a predetermined speed.

12. The apparatus recited in claim 11, further comprising:
    means for converting said doppler shift
    means for comparing a reference indicative of a doppler shift in frequency corresponding to said predetermined speed, to said voltage and producing an output having a first state when said voltage is less than or equal to said reference and a second state when said voltage from said discriminator exceeds said reference.

13. The apparatus recited in claim 12, wherein said reference is adjustable to correspond to road conditions about to be encountered by said vehicle.

14. The apparatus recited in claim 11, comprising circuitry implementing a Fourier transform to convert said doppler shift to said voltage.

15. The apparatus recited in claim 11, comprising a discriminator.

16. The apparatus recited in claim 1, wherein said message comprises information concerning driving conditions about to be encountered by said vehicle.

17. The apparatus recited in claim 1, wherein said message comprises a warning about proximity of another object to said vehicle.

18. The apparatus recited in claim 1, wherein said message comprises a warning that said vehicle should reduce speed to accommodate conditions in an area about to be encountered by said vehicle.

19. The apparatus recited in claim 1, wherein said message indicates one of a plurality of predetermined text messages used to alert a driver to a condition in an area about to be encountered by said vehicle.

20. The apparatus recited in claim 1, wherein said message is an externally generated message received by said apparatus through an external input.

21. The apparatus recited in claim 20, wherein said message is a free format message having less than a predetermined number of characters.

22. The apparatus recited in claim 1, further comprising a receiver to receive radar reflections from said vehicle and to determine a velocity of said vehicle from said radar reflections by comparing said velocity of said vehicle to a threshold and providing commands to said controller to modulate said signal generator to transmit said message when said velocity of said vehicle exceeds said threshold and to transmit without modulation otherwise.

23. A receiver for receiving messages transmitted thereto comprising:
    a receive antenna;
    a detector/mixer operatively connected to receive a signal output from said receive antenna;
    a fixed or variable frequency first local oscillator operatively connected to provide a fixed or an adjustable difference frequency signal to said mixer;
    an intermediate frequency stage having an IF bandwidth and receiving an output of said mixer, said intermediate frequency stage being operative to adjust one of said local oscillator or a second local oscillator to place said output of said mixer in a center region of said IF bandwidth in response to receipt of a CW marker signal;

a frequency discriminator configured to produce, after cessation of receipt of said CW marker signal, a predetermined voltage each time the frequency of said signal output from said receive antenna varies, a logical state of a bit of said message being changed from a logical state of a preceding bit when said frequency of said signal output sweeps in frequency by a predetermined amount.

24. The apparatus recited in claim 23, comprising a voltage detector to detect said predetermined voltage, induced by the change of received frequency.

25. A transceiver for transmitting a message to a vehicle comprising:

an antenna;

a modulator, said modulator being one of a phase modulator and a frequency modulator;

an oscillator responsive to said modulator to produce one of a phase modulated and a frequency modulated signal;

a mixer;

a turnstile circuit routing a first portion of said modulated signal to said antenna and a second portion of said modulated signal to said mixer, said turnstile circuit further routing a radar reflection from said vehicle received by said antenna to said mixer;

a discriminator operatively connected to receive an output of said mixer, said output of said mixer having a frequency indicative of a speed of said vehicle, said discriminator producing a voltage indicative of said speed of said vehicle; and a modulation controller responsive to said voltage to control said modulator to modulate one of frequency and phase of said portion of said modulated signal routed to said antenna to produce transitions detectable by a receiver in said vehicle, said transitions comprising portions of said message.

26. The apparatus recited in claim 25, wherein said modulation controller routes commands to said modulator to modulate said oscillator to produce first signals having a first phase and second signals having a second phase, said transitions being between said first and said second phases representing a first logical state and a second logical state of a bit of said message.

27. The apparatus recited in claim 25, wherein said modulation controller routes commands to said modulator to modulate said oscillator to produce first signals having a first frequency and second signals having a second frequency, said transitions being between said first and said second frequencies representing a first logical state and a second logical state respectively of a bit of said message. message.

28. A transceiver for transmitting a message to a vehicle operating at excessive speed comprising:

an antenna;

a variable frequency oscillator responsive to a controller to produce a swept frequency signal;

a mixer;

a turnstile circuit routing a first portion of said swept frequency signal to said antenna and a second portion of said swept frequency signal to said mixer, said turnstile circuit further routing a radar reflection from said vehicle received by said antenna to said mixer;

a discriminator operatively connected to receive an output of said mixer, said output of said mixer having a frequency indicative of a speed of said vehicle, said discriminator producing a voltage indicative of said speed of said vehicle;

said controller being responsive to said voltage to control said variable frequency oscillator to sweep said frequencies within at least a portion of said frequency band at a first rate and a second rate, said first rate representing a first logical state and said second rate representing a second logical state of bits of said message transmitted by said transceiver.

29. A transmitter for transmitting a message to a vehicle comprising:

a signal generator operative to produce CW marker signals and signals swept over a predetermined frequency band; and a controller, said signal generator being responsive to said controller to generate said CW marker signal and subsequently to sweep said signals within said frequency band in a first direction from a higher frequency to a lower frequency and in a second direction from a lower frequency to a higher frequency, said first and second directions each representing a different logical state of bits of said message, said signal generator further configured to transmit said CW marker signal, and to transmit said bits of said message after said CW marker signal turns off.

30. A transceiver for transmitting a message to a vehicle operating at excessive speed comprising:

an antenna;

a variable frequency oscillator responsive to a controller to produce a swept frequency signal;

a mixer;

a turnstile circuit routing a first portion of said swept frequency signal to said antenna and a second portion of said swept frequency signal to said mixer, said turnstile circuit further routing a radar reflection from said vehicle received by said antenna to said mixer;

a discriminator operatively connected to receive an output of said mixer, said output of said mixer having a frequency indicative of a speed of said vehicle, said discriminator producing a voltage indicative of said speed of said vehicle;

said controller being responsive to said voltage to control said variable frequency oscillator to sweep frequency in a first direction from a higher frequency to a lower frequency and in a second direction from a lower frequency to a higher frequency, said first and second directions each representing a different logical state of bits of said message transmitted by said transceiver.

31. A transceiver as recited in claim 30, wherein said oscillator is responsive to said controller to periodically produce a (continuous wave) CW marker signal at a fixed frequency for a fixed time period.

32. A method of transmitting messages to a vehicle equipped with a radar detector, the method comprising the steps of:

generating a signal comprising a CW marker and a modulated signal having frequencies in a police radar band, said modulated signal transmitting codes for bits of a message after said CW marker turns off, said CW marker signal having signal characteristics for detection by both a receiver with a message decoder for detecting said message and by a conventional radar detector not responsive to said codes wherein said step of modulating said signal comprises frequency modulating said signal after transmission of said CW marker wherein said step of frequency modulating said signal comprises modulating said signal to transmit a first frequency and a second frequency, sweeps between said first and second frequencies representing logical states of said bits.

33. The method recited in claim 32, wherein the step of modulating said signal further comprises sweeping said signal within a predetermined frequency range from a high frequency to a low frequency to represent a first logical state and from a low frequency to a high frequency to represent a second logical state of one of said bits.

34. The method recited in claim 32, wherein the step of modulating said signal further comprises sweeping said radar signal at a first rate to represent a first logical state and at a second rate to represent a second logical state of one of said bits.

35. The method recited in claim 32, further comprising:
receiving radar reflections from said vehicle and determining a velocity of said vehicle from said radar reflections;
comparing said velocity of said vehicle to a threshold; and
modulating said radar signal to transmit said message when said velocity of said vehicle exceeds said threshold and to transmit without modulation otherwise.

36. A message detector responsive to a CW marker signal to cause said message detector to set up to monitor a frequency band for transitions in signal characteristics within said frequency band subsequent to receipt of said CW marker signal and after said CW marker signal turns off, said transitions being indicative of bits of a message, comprising a local oscillator having an output applied to a mixer, said mixer outputting an IF center signal in a center of an IF band upon receipt of said CW marker, said mixer further outputting IF signals representing said transitions in signal characteristics, said IF signals sweeping between a first frequency below a center frequency of said IF band and a second frequency above said center frequency of said IF band to indicate said transitions.

37. A message detector as recited in claim 36 said IF signal sweeping in a first direction to indicate a first state of a bit of said message and to transitions of said IF signal sweeping in a second direction to indicate a second state of a bit of said message.

38. A message detector as recited in claim 37, comprising a memory, said memory being responsive to at least some bits of said message to output information stored in said memory.

39. A message detector responsive to a CW marker to receive messages transmitted thereto comprising:
a receive antenna;
a detector/mixer operatively connected to receive a signal output from said receive antenna;
a fixed or variable frequency first local oscillator operatively connected to provide a fixed or an adjustable difference frequency signal to said mixer;
an intermediate frequency stage having an IF bandwidth and receiving an output of said mixer, said intermediate frequency stage being operative to set up said message detector to receive said message by adjusting one of said local oscillator or a second local oscillator to place said output of said mixer in a center region of said IF bandwidth in response to receipt of said CW marker signal, wherein said message detector receives said message after said CW marker signal turns off;
a frequency discriminator producing a predetermined voltage each time the frequency of said signal output from said receive antenna varies after receipt of said CW marker, a logical state of a bit of said message being changed from a logical state of a preceding bit when said frequency of said signal output from said receive antenna sweets within said IF bandwidth by a predetermined amount.

40. A message detector as recited in claim 39, said message decoder producing a first logical state of a bit of said message in response to said frequency sweeping within a predetermined range in a first direction and a second logical state in response to said frequency sweeping within a predetermined range in a second direction.

41. A message detector as recited in claim 39, said message detector being responsive to bits of said message only after termination of said CW marker.

\* \* \* \* \*